(12) United States Patent
Pouchkarev

(10) Patent No.: US 7,137,409 B2
(45) Date of Patent: Nov. 21, 2006

(54) MULTILAYERED PRESSURE VESSEL AND METHOD OF MANUFACTURING THE SAME

(76) Inventor: Alexander S. Pouchkarev, 1039 Fontana Dr., Alameda, CA (US) 94502

( * ) Notice: Subject to any disclaimer, the term of this patent is extended or adjusted under 35 U.S.C. 154(b) by 274 days.

(21) Appl. No.: 10/509,211

(22) PCT Filed: Sep. 16, 2003

(86) PCT No.: PCT/US03/29140

§ 371 (c)(1),
(2), (4) Date: Sep. 24, 2004

(87) PCT Pub. No.: WO2004/026716

PCT Pub. Date: Apr. 1, 2004

(65) Prior Publication Data
US 2005/0205137 A1    Sep. 22, 2005

(51) Int. Cl.
*F17D 1/00* (2006.01)
*B65D 30/10* (2006.01)
*B65D 33/00* (2006.01)

(52) U.S. Cl. .................... 137/571; 383/107; 383/59

(58) Field of Classification Search ........... 137/571; 383/59, 107
See application file for complete search history.

(56) References Cited

U.S. PATENT DOCUMENTS

| | | | | |
|---|---|---|---|---|
| 5,437,507 A | * | 8/1995 | Blumenkron | 383/107 |
| 5,553,942 A | * | 9/1996 | Domke et al. | 383/101 |
| 6,046,443 A | * | 4/2000 | Ackerman et al. | 219/727 |
| 6,095,732 A | * | 8/2000 | Howlett et al. | 410/119 |
| 6,186,714 B1 | * | 2/2001 | Berrier et al. | 410/119 |
| 6,251,154 B1 | * | 6/2001 | van Rossen | 55/382 |

* cited by examiner

*Primary Examiner*—John Rivell
(74) *Attorney, Agent, or Firm*—Craig M. Stainbrook; Stainbrook & Stainbrook, LLP

(57) ABSTRACT

A multilayered pressure vessel (10) fabricated from at least one single ply sheet of flexible material (100) having an approximate longitudinal midline which divides the material into an inner portion (130) having an inner surface, an outer surface, an edge, a seam allowance, and a width, and an outer portion having an inner surface, an outer surface, an edge, a seam allowance, and a width. The width of the outer portion (120) is greater than the width of the inner portion (140). A primary seam (250) binds the outer portion and the inner portion to the material sheet at the midline proximate the outer portion edge and inner portion edge. The sheet (100) is wrapped into a continuous substantially 720 degree wrap to form a generally cylindrical vessel body having possible multiple fluid passageways, at the election of the user. The primary seam (250) is concealed.

17 Claims, 15 Drawing Sheets

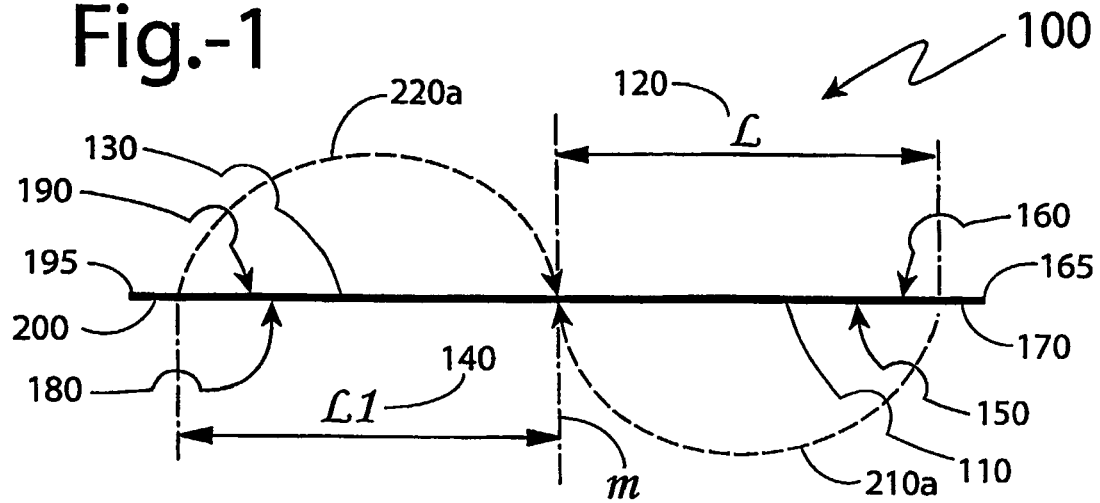
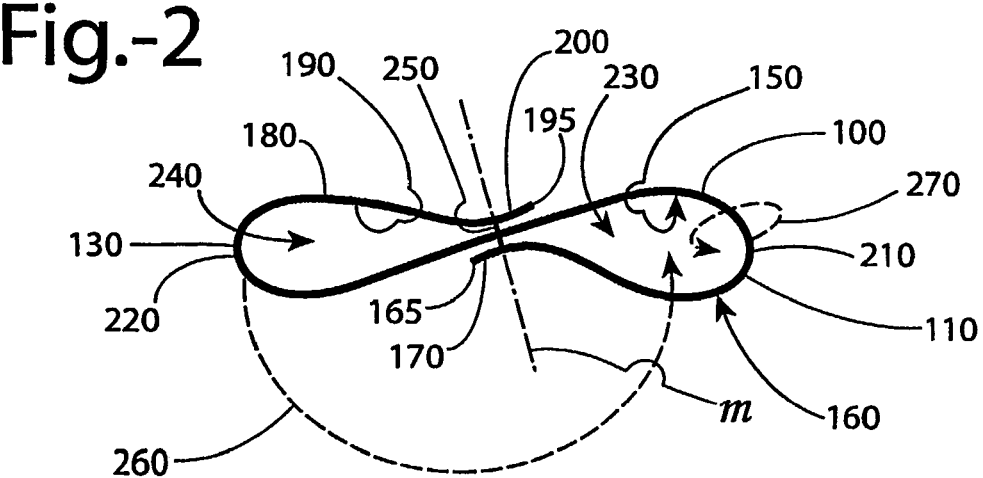
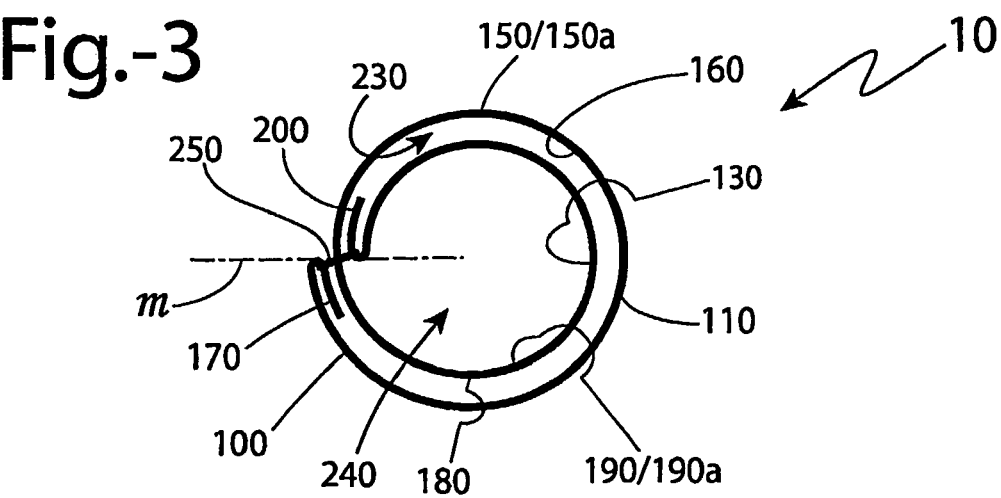

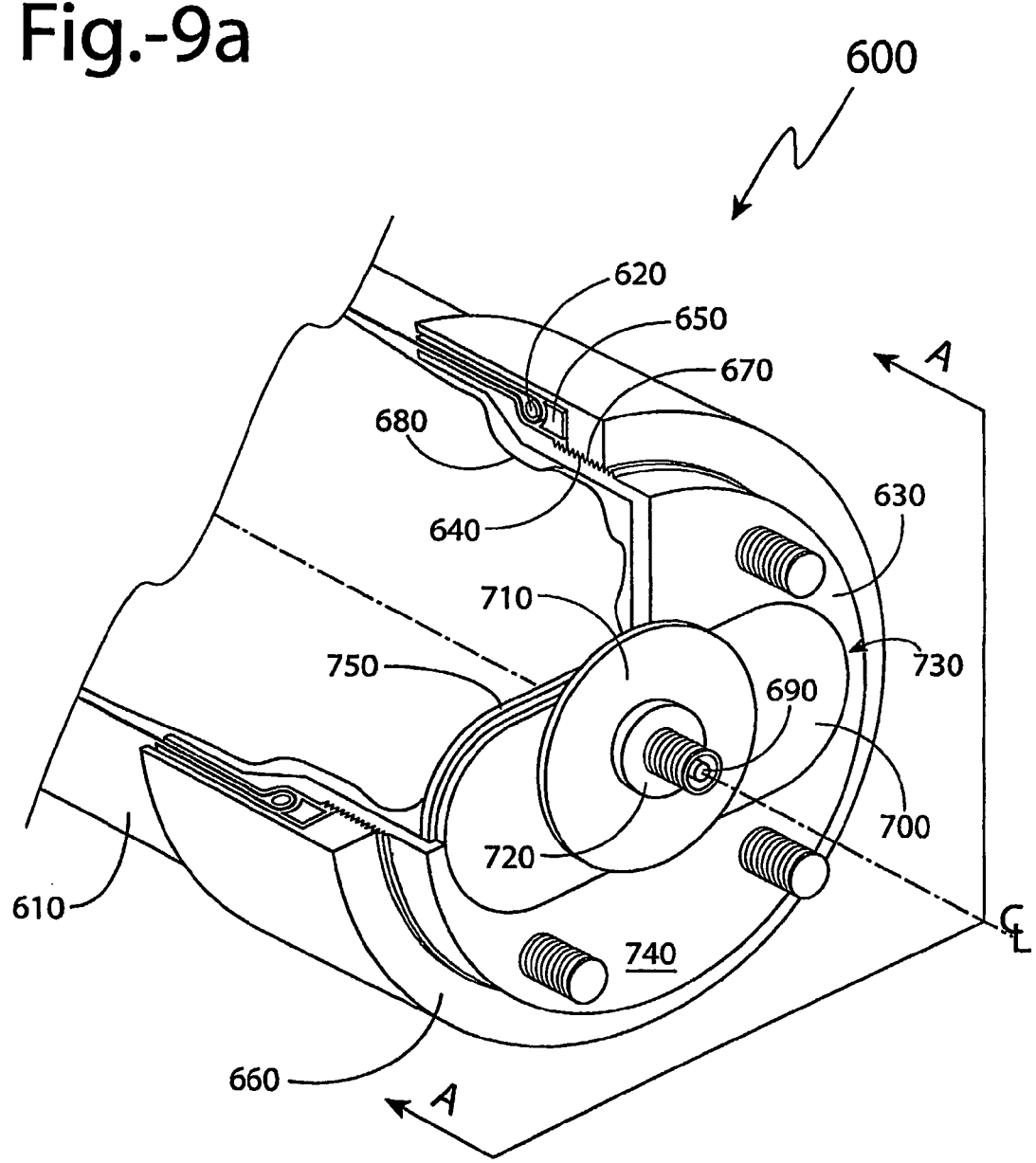

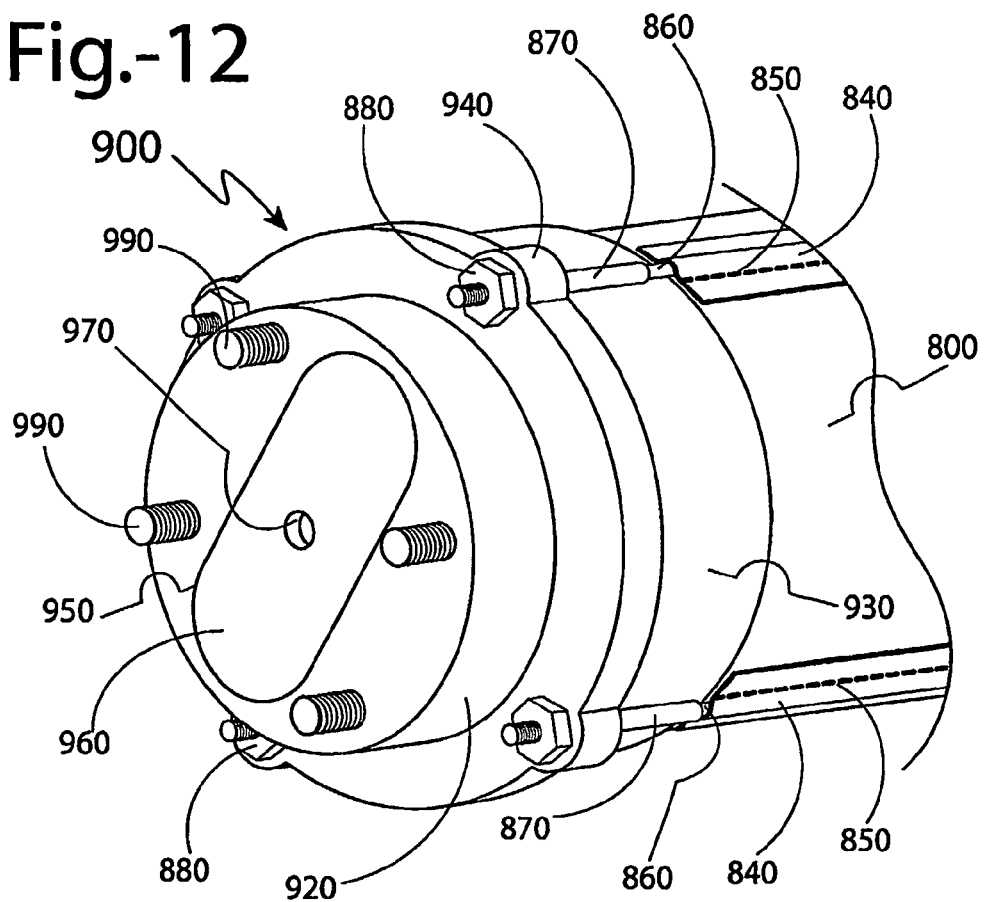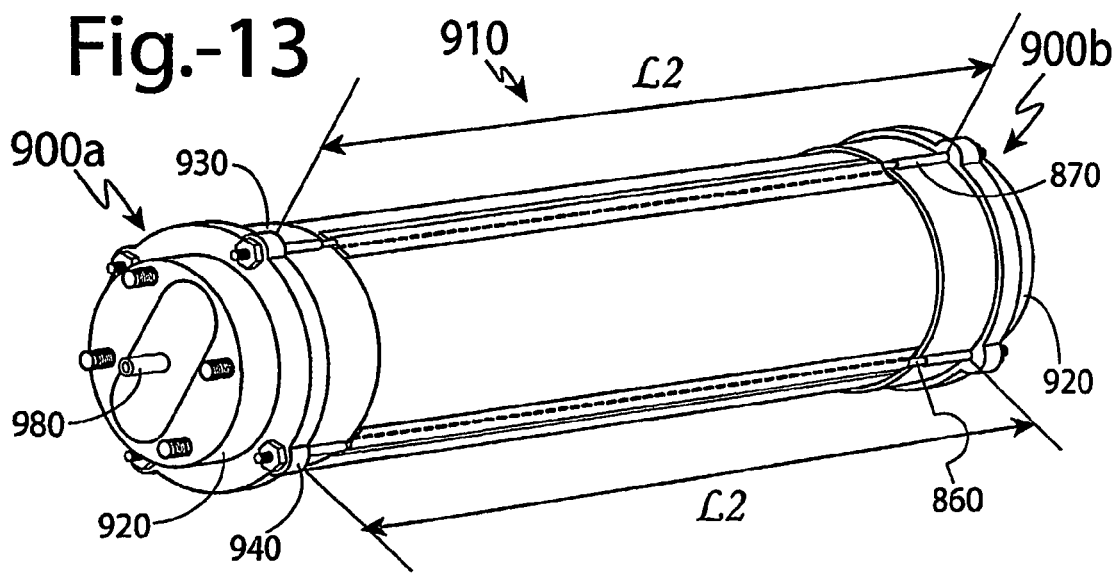

MULTILAYERED PRESSURE VESSEL AND METHOD OF MANUFACTURING THE SAME

BACKGROUND OF THE INVENTION

1. Technical Field

The present invention relates generally both to devices for conveying or storing gasses and to structural elements such as columns, beams, struts, and the like. More particularly, the present invention relates to a light weight inflatable pneumatic structural members deployed into serviceable condition by internal gas pressure. Even more particularly, the present inventions relates to a multilayered pressure vessel suitable for use in storing and conveying gasses, and especially well-suited for use as an inflatable load-bearing element. Also disclosed is a method of manufacturing the same.

2. Background Art

By definition pressure vessels comprise those vessels that have an internal pressure higher than the external atmospheric pressure. Such vessels include those that contain fluids, i.e., fluid storage tanks, and those that convey fluids, such as hoses. It is known to fabricate pressure vessels of flexible rather than rigid material, as this offers a reduction of mass and storage volume compared to rigid material systems. However, it is a relatively recent development in the technology of structural materials to compose columns, beams, struts, trusses, and the like, of inflatable rather than rigid materials. This advancement is still becoming fully appreciated, and the contemplated fields of use continue to expand rapidly.

In manufacturing inflatable structural members, the primary structural requirements that inform the design and selection of materials include: (1) general compressive buckling; (2) beam stiffness and natural frequency; and (3) beam bending buckling. Design parameters include: (1) the radius of the tube; (2) tube thickness; (3) tube length; (4) the modulus of elasticity; and (5) material density. Inflatable structural members have been devised to possess sufficiently desirable structural characteristics to enable use in a variety of fields. Inflatable structural members are even contemplated for use in extreme and exotic environments, most notably outer space.

For instance, as noted by S. L. Veldman and C. A. J. R. Vermeeren in *Inflatable Structures in Aerospace Engineering—an Overview* (April 2001), inflatable circular cylindrical beams are able to support structures such as solar array systems, telescope mirrors, sun shields and solar sails, truss structures, and the like. They may also be employed in permanent and temporary inflatable space habitats, and even in reentry and recovery vehicles. The authors note that in such applications, the low mass, low storage volume and ease of deployment are factors that reduce cost considerably.

More conventional applications are well known, and range across a diverse spectrum of possibilities, including columns, beams, booms, trusses, struts, cantilevers, shelters, linear actuators, ladders, antennas, masts, frame links, and so forth. The obvious advantage is that the potential structure may be transported to the construction site in a relatively collapsed or flat condition, perhaps on a reel or in racks, and it may then be deployed and installed in a structure. If rigidized, it may remain relatively permanent; if not, it may be collapsed for storage and transport once again.

The advantages of flexible structural members were recognized at least as early as 1968, when U.S. Pat. No. 3,364,623 was issued to the Canadian Peter Isaac. His patent discloses an inflatable structural member made of stiff resilient material which is normally flexible and capable of being stored on a reel, but becomes erectly rigid when inflated. The member is stored on a reeled state in the flexible state and may be fed from the reel in a rigid state in a cantilever manner without guidance other than from the reel. The member is capable of carrying tensile, compressive, or flexural loads after unreeled.

A later, though not significantly more mature, expression of the art is illustrated in U.S. Pat. No. 4,514,447, issued to Boxmeyer in 1985, which teaches a lightweight, inflatable structural member, having a substantially tubular shape and sealed at both ends, including an inner lining to maintain internal pressure upon inflation. The inner lining is covered with a filament reinforced matrix structure comprising resin impregnated filaments of high tensile strength. The uninflated structural member is stowable in a collapsed condition. Curing of the resin matrix is inhibited by storing the collapsed member at a low temperature. Prior to use, the member is inflated with a fluid and heated to enable curing of the resin matrix.

This method of manufacturing a rigid structural member by inflatable flexible material and coating or otherwise rigidizing the material with resin was recognized much earlier, in U.S. Pat. No. 3,138,506, to Ross, which discloses a method of manufacturing an article of stiffened fibrous material comprising the steps of providing a pliable article having spaced fibrous walls and ties connecting the spaced walls; inflating the fibrous article; applying a resin bonded fibrous material over the inflated article; and hardening the resinous band while the article is inflated to tension the material.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention in various national offices. However, it is respectfully submitted that none of the above-indicated patents disclose, teach, suggest, show, or otherwise render obvious, either singly or when considered in combination, the invention described and claimed herein.

Additionally, and as will be readily appreciated, the structural elements taught in each of Boxmeyer and Ross require more than pneumatic pressure to provide the desired structural characteristics, and after rigidization they are incapable of collapse for storage and transportability. Furthermore, the structural member of Isaac may be fabricated from flexible material, but the manufacturing process entails use of a tube to which upper and lower members, joined by hinges, are affixed. Thus, provision of an article already comprising a pressure vessel, namely a tube, is a predicate to the construction of the device shown in Isaac.

Accordingly, it would be desirable to provide a pressure vessel fabricated from flexible material that may be adapted for a variety of uses ranging from use as structural member when inflated, to use as a fluid conveyance means when uninflated and configured as a hose or filter. It would further be desirable that such a member be capable of collapse for easy storage and transport. Finally, it would be desirable to have an inexpensive and mechanically simple means of constructing such a pressure vessel.

DISCLOSURE OF INVENTION

The above-indicated needs are met by the present invention, which has a number of advantages over the prior art.

It is an object of the present invention to provide a new and improved multilayered or multi-ply pressure vessel that is readily adapted for use as a structural member.

It is another object of the present invention to provide a new and improved multilayered pressure vessel that may be readily adapted for use as a fluid container and/or fluid conveyor.

A further object or feature of the present invention is to provide a new and improved multilayered pressure vessel suitable for use as a fluid filter.

An even further object of the present invention is to provide a new and improved multilayered pressure vessel easily manufactured from a single sheet of flexible material.

A still further object of the present invention is to provide a new and improved multilayered pressure vessel easily modified at manufacture to have discrete compartments for containing, conveying, and/or segregating various materials.

Yet another object of the present invention is to provide a new and improved multilayered pressure vessel having a single internal seam which distributes tensile forces throughout the interior of the vessel.

A further object of the present invention is to provide a multilayered, multi-chambered, and multipurpose pressure vessel for selectively conveying and discharging one or more fluids.

Yet another object of the present invention is to provide multilayered pressure vessel having at least two interior passages for simultaneously conducting two different fluids in two different states, namely, gas and liquid.

Another object of the present invention is to provide a method of manufacturing a multilayered pressure vessel that is simple in concept and in execution and that obviates the need for expensive machinery.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

The present invention is a multilayered pressure vessel which is readily adapted for use as a volumetric container, a hose, a filter, and a structural member, such as a beam, boom, truss, strut, column, and the like. In a first preferred embodiment, the apparatus may be summarily characterized as a multilayered pressure vessel having at least one single ply sheet of flexible material having an approximate longitudinal midline dividing the sheet into an unequal geometry of inner and outer portions. Each portion has an inner surface, an outer surface, an edge, a seam allowance, and a width. The width of the outer portion is greater than the width of the inner portion. In an early manufacturing step, the outer and inner portions are folded to created side-by-side passageways in a substantially figure-8 multi-ply configuration. A seam is placed through the outer and inner portions and the sheet of flexible material at the approximate longitudinal midline and near the outer and inner portion edges. The inner portion is then pulled into and down the outer portion passageway while the outer portion is turned inside out and over the inner portion, so that at the completion of this manufacturing step a substantially continuous 720 degree wrap of material forms a generally cylindrical vessel body in which the outer surface of the outer portion forms the outside surface of the pressure vessel body, the inner surface of the inner portion forms the innermost surface of the pressure vessel body, the outer surface of the inner portion and the inner surface of the outer portion are in face-to-face relation, and the seam is concealed by the seam allowance of the outer portion.

The vessel body formed according to the inventive method summarized above may be equipped with end fittings for introducing and containing fluids in the vessel body and for connecting separate pressure vessels to one another or to other structures. Additionally, the manufacturing method facilitates the attachment of exterior and interior surface reinforcement sleeves, handles, exterior surface textures, and the like. It also facilitates the inclusion of a plurality of interior passageways. It does so because the material is ultimately turned inside-out in manufacture. Thus, in the manufacturing process, the surface that will ultimately be an interior surface in the vessel body is exposed as an exterior surface in the first steps of manufacture. Thus, until the final stages of manufacturing, there is provided a working surface for easy modification of the interior surface according to the anticipated end uses.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the national patent office(s) and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

FIG. 2 is an end view in elevation of the fabric sheet of FIG. 1 shown with the outer and inner passageways of the inventive vessel formed with folds and also showing placement of the single primary seam of the constructed vessel;

FIG. 3 is an end view in elevation of the constructed multilayered pressure vessel of the present invention in its most elemental form;

FIG. 9A is a partial cross-sectional perspective view of the complete fitting of FIG. 9, also showing the terminal fitting elements;

FIG. 12 is a perspective view of the pressure vessel end of FIG. 10 having an end fitting fully installed;

FIG. 13 is a side perspective view of a complete pressure vessel with end fittings at each end of the pressure vessel and tuning cables installed in sleeves disposed between the ends;

REFERENCE NUMBER LEGEND

Figure 1A:
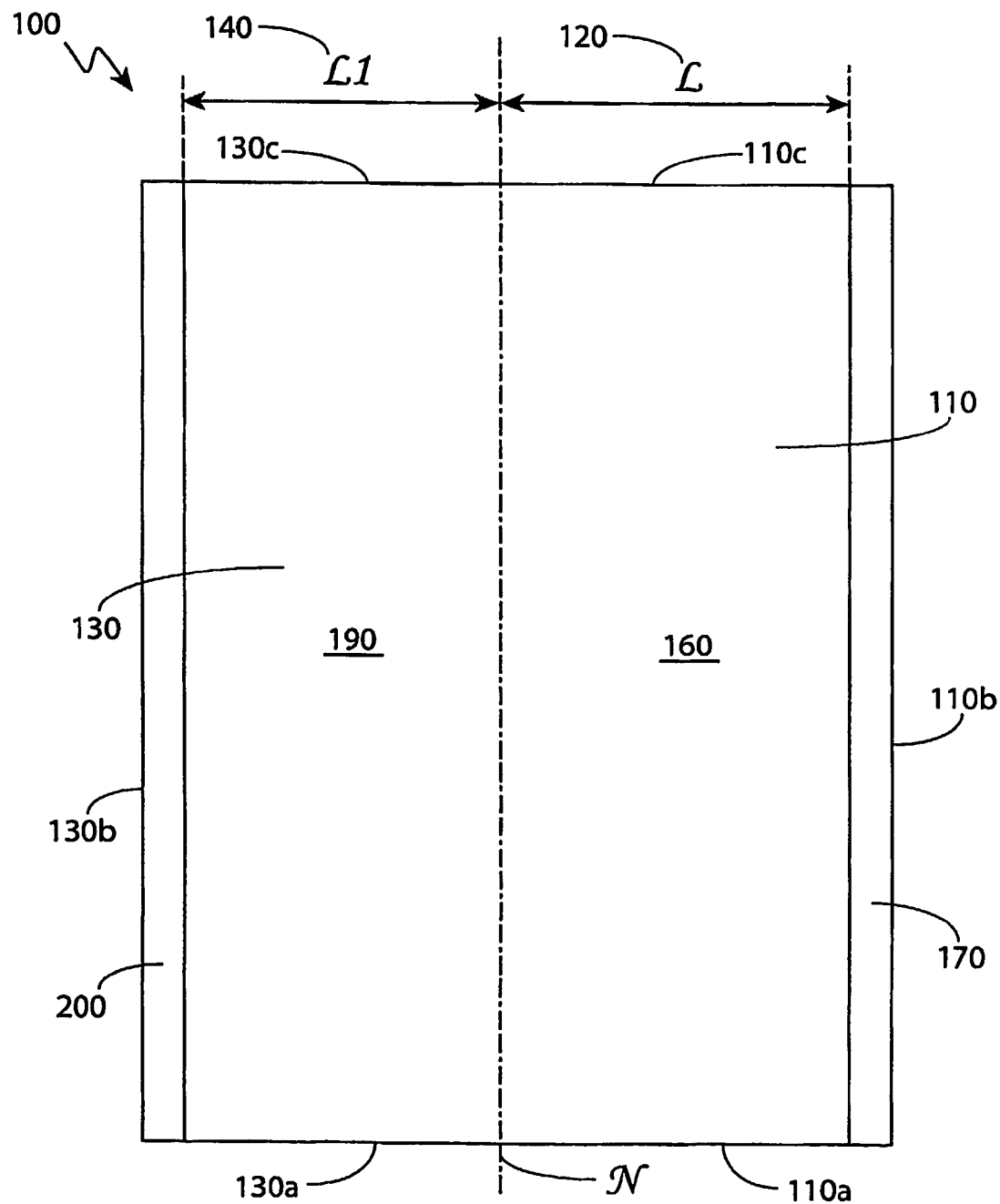
FIG. 1 is an end view in elevation of a single sheet of flexible fabric (viewed on edge), showing the geometry and general relative dimensions of the various portions of the inventive multilayered pressure vessel before construction.

Embodiments of the invention are shown in FIGS. 1–24. The elements in FIGS. 1–24 are as follows:

10 vessel body of the first preferred embodiment of the multilayered pressure
100 flexible fabric sheet
110 outer portion
120 width of outer portion
130 inner portion
140 width of inner portion
150 outer surface of outer portion
150a exterior surface of (fully formed) multilayered pressure vessel
160 inner surface of outer portion
165 outer portion edge
170 outer portion seam allowance
180 outer surface of inner portion
190 inner surface of inner portion
195 inner portion edge
200 inner portion seam allowance
210 outer portion fold
210a direction of fold for outer portion
220 inner portion fold
220a direction of fold for inner portion
230 outer passageway
240 inner passageway
250 primary seam
250a–d hidden seam segments
M approximate longitudinal midline of fabric sheet
260 intermediate portion fabric sheet
270 upper flap inner portion
280 lower flap of outer portion
290 thread
300 sewing machine
310 inner portion pulling means
320 inner portion fold
330 line affixed to inner portion fold
340 proximate end of fabric
350 distal end of fabric
360 potential space separating outer portion inner surface and inner portion outer surface
400 flexible fabric sheet for second preferred embodiment
410 outer portion
420 inner portion
430 width of outer portion
440 width of inner portion
450 attachment element
460 attachment element
470 attachment means
480 attachment means
490 outer surface of outer portion
500 inner surface of inner portion
510 vessel body of second preferred embodiment
520 seam
520a–d hidden segments 510a–d of seams 600 end fitting (selected elements)
610 cylindrical pressure vessel body
620 retaining ring
630 cap neck
640 threaded portion of cap neck
650 retaining washer
660 pressure lock ring
670 threaded portion of pressure lock ring
680 inflatable bladder
690 valve stem
700 port plug
710 washer
720 nut
730 oval-shaped opening in terminal side of cap neck
740 terminal side of cap neck
750 interior flange of port plug
800 third preferred embodiment of inventive pressure vessel
810a–d tuning cable passages
820 exterior surface of outer portion
840a–d fabric strips affixed to outer portion to form tuning cable sleeves
850a–d edges of fabric strips
860 tuning cable (generally)
860a–d tuning cables
870 threaded pin
880 nut
900 alternative end fitting (generally)
900a first end fitting
900b second end fitting
910 tunable length of vessel body
920 cap neck
930 pressure lock ring
940 rim of pressure lock ring
950 oval shaped opening on terminal side of cap neck
960 port plug
970 hole for valve stem
980 valve stem
990 threaded studs
1000 fourth preferred embodiment of inventive pressure vessel
1010 vessel body of fourth preferred embodiment
1020 tuning cable sleeves
1030 interior surface of outer portion of vessel body
1040 outer portion of vessel body
1050 tuning cables
1100 airfoil having tubular pressure vessel spars
1120 upper airfoil surface
1130 lower airfoil surface
1200 multi-chambered tubular pressure vessel structural member
1210 tubular pressure vessels
1220 end fittings
1230 fluid conduits
1240 gas inlet
1300 fifth preferred embodiment of inventive pressure vessel
1310 vessel body of fifth preferred embodiment
1320 flange
1330 seams attaching flange to outer surface of vessel body
1340 outer surface of vessel body
1350 grommets
1360 support line
1400 connection means for connecting plurality of pressure vessels
1410 outer surfaces of vessel bodies
1500 connection means
1510 outer surfaces of vessel bodies
1600 sixth preferred embodiment of inventive pressure vessel
1610 first fabric sheet
1620 second fabric sheet
1630 first fluid passageway
1640 second fluid passageway
1650 third fluid passageway
1660 fourth fluid passageway
1670a–d first through fourth layers of vessel body
1680 primary seam
1700 seventh preferred embodiment of inventive pressure vessel
1710 vessel body of seventh preferred embodiment
1720 first interior fluid passage
1730 second interior fluid passage
1740 third interior fluid passage
1750 first material attachment
1750a first edge of first material attachment
1750b second edge of first material attachment
1760 second material attachment
1760a first edge of second material attachment
1760b second edge of second material attachment
1770 third material attachment
1770a first edge of third material attachment
1770b second edge of third material attachment
1780 interior surface of the vessel body
1800 fabric sheet for eighth preferred embodiment of inventive pressure vessel
1810 outer portion of fabric sheet for eighth preferred embodiment
1820 inner portion
1830 midline axis (of symmetry)
1840 first side (of outer portion)
1850 second side (of outer portion)
1860 third side (of outer portion)
1870 first side (of inner portion)
1880 second side (of inner portion)
1890 third side (of inner portion)
1900 vessel body of eighth preferred embodiment
1910 large opening
1920 small opening
1930 passageway between inner and outer portions

BEST MODE FOR CARRYING OUT THE INVENTION

Referring to FIGS. 1 through 24, wherein like reference numerals refer to like components in the various views, FIGS. 1 and 1a are, respectively, an end view in elevation and a top plan view of a single sheet of flexible fabric 100, showing the geometry and relative general dimensions of the various portions of the inventive vessel before construction. The sheet may be a single ply sheet or it may be multi-ply. In either case, in the first preferred embodiment of the present invention, the fabric sheet it is preferably substantially rectangular and elongate and is unevenly divided by an approximate longitudinal midline M into an outer portion 110 having a width l 120, and an inner portion 130 having a width $l_1$ 140, which is smaller than that if the outer portion. The inner and outer portions, each comprise a quadrilateral, defined by sides 110a, 110b, 110c and M, and 130a, 130b, 130c and M, respectively. In the first preferred embodiment of the inventive apparatus, the quadrilaterals comprising the inner and outer portions are substantially rectangular. The disparate widths of the inner and outer portions are necessary to achieve the configuration of the finished inventive article.

The outer portion of the fabric sheet has an outer surface 150, an inner surface 160, an outer portion edge 165, and a seam allowance 170. The inner portion has an outer surface 180, and inner surface 190, an inner portion edge 195, and a seam allowance 200. This view also illustrates the direction of fold 210a, 220a, for the outer and inner portions, respectively.

FIG. 2 shows the fabric sheet of FIG. 1 with the outer passageway 230 and inner passageway formed from making an outer portion fold 210 and an inner portion fold 220. The outer portion is folded under the fabric sheet such that its edge extends slightly beyond the approximate midline to form its seam allowance. The inner portion is folded over the fabric sheet such that its edge extends slightly beyond the approximate midline to form its seam allowance. A single primary seam 250 is placed through all layers of the fabric, including the seam allowances, at substantially the approximate midline M. Placement of the primary seam is made before the final construction steps and creates the dual continuous loop shown in this figure. The final construction steps comprise pulling inner portion 130 into outer passageway 230 and pulling it lengthwise down the outer passageway from the proximal end 340 of the fabric while simultaneously turning outer portion 110 inside out and over the inner portion beginning from the distal end 350 and proceeding towards the proximal end (see also FIG. 4).

FIG. 3 is an end view in elevation of the first preferred embodiment of a fully constructed multilayered pressure vessel 10 in its most elemental form having a simple tubular or cylindrical body. This view shows that the outer portion 110 and inner portion 130 may be spaced apart to define an outer passageway 230. Alternatively, the outer and inner portions may be sized so that there is no effective space separating the portions when fully assembled. Whether spaced apart or fully approximated, the inner surface of the outer portion and the outer surface of the inner portion oppose one another in a face-to-face relation. Details of this configuration are shown in FIG. 5.

Figure 4:
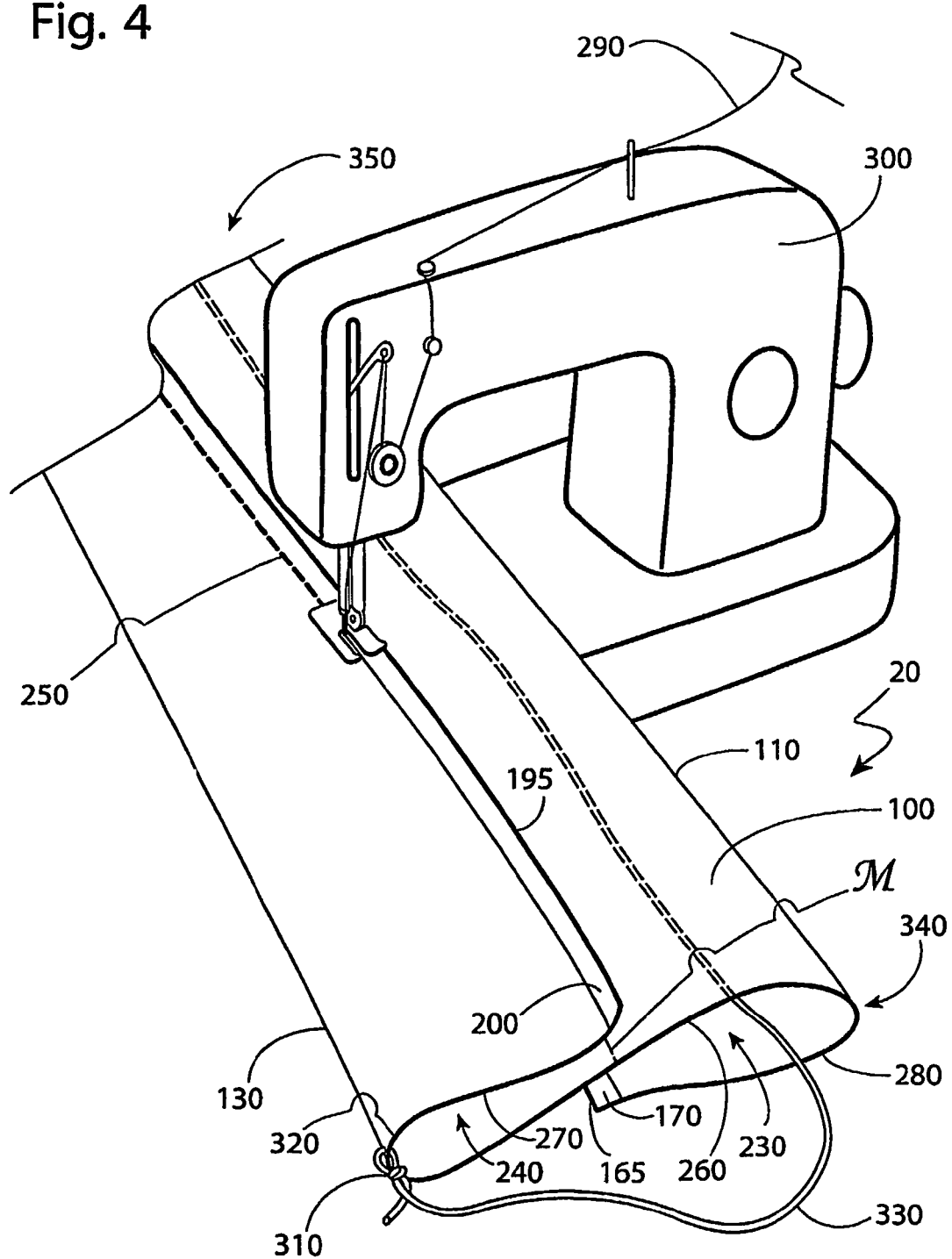
FIG. 4 is a perspective view showing an intermediate manufacturing step and illustrating means for the final step for forming the vessel body.

FIG. 4 is a perspective view illustrating the condition of the pressure vessel during manufacture, showing an intermediate manufacturing step and illustrating means for the final step for forming the vessel body. In this view it is shown that the pressure vessel of the present invention is manufactured in a simple manner, entailing the steps of: (a) providing a generally elongate fabric sheet 100 having a proximal end 340, a distal end 350, and first and second edges 165, 195; (b) folding the sheet by bringing the first edge downward and under the sheet to form an outer portion 110 having an outer portion flap 280, an outer passageway 230, and a first seam allowance 170; (c) folding the sheet again by bringing the second edge upward and over the sheet to form an inner portion 130 having an inner portion flap 270, an inner passageway 240, and a second seam allowance 200, and such that the first and second seam allowances overlap and a section of fabric sheet is interposed between the inner and outer portion flaps and the first and second seam allowances to form a multilayered configuration 20; (d) sewing a seam to make a single primary seam 250, which binds the layers of the multilayer configuration together; (e) providing pulling means 310 and affixing the pulling means to the inner portion upper flap 270 at the proximate end 340 of the fabric and preferably at the fold 320 of the inner portion (in very small and lightweight embodiments, the pulling means may comprise nothing more than gripping the fold with the human hand; however, under most circumstances it would be preferable to have a line 330 or functionally comparable pulling means anchored to and extended from the inner portion fold 320, into and through outer passageway 230, to facilitate the process of pulling inner portion 130 into the outer passageway); (f) pulling the inner portion into outer passageway 230 at the proximate end 340 while simultaneously turning outer portion 110 inside out by pulling its distal end 350 over the increasingly overlapping outer and inner passageways, which effectively turns the entire apparatus inside out and pulls primary seam 250 inside, interposing it between the outer portion 110 and the inner portion 130, and thereby hiding seam segments 250a, 250b, 250c, and 250d.

By constructing the vessel body in this fashion, the seam is concealed and not exposed to outside forces that cause wear and tear of the seam or otherwise expose it to degradation. Depending on the materials employed and the scale of production, this simple manufacturing process can eliminate the need for elaborate machinery, though it is contemplated that many industrial applications will call for a vessel body of sufficient size and strength to necessitate mechanical forces to effect steps (e) and (f), above.

Figure 5:
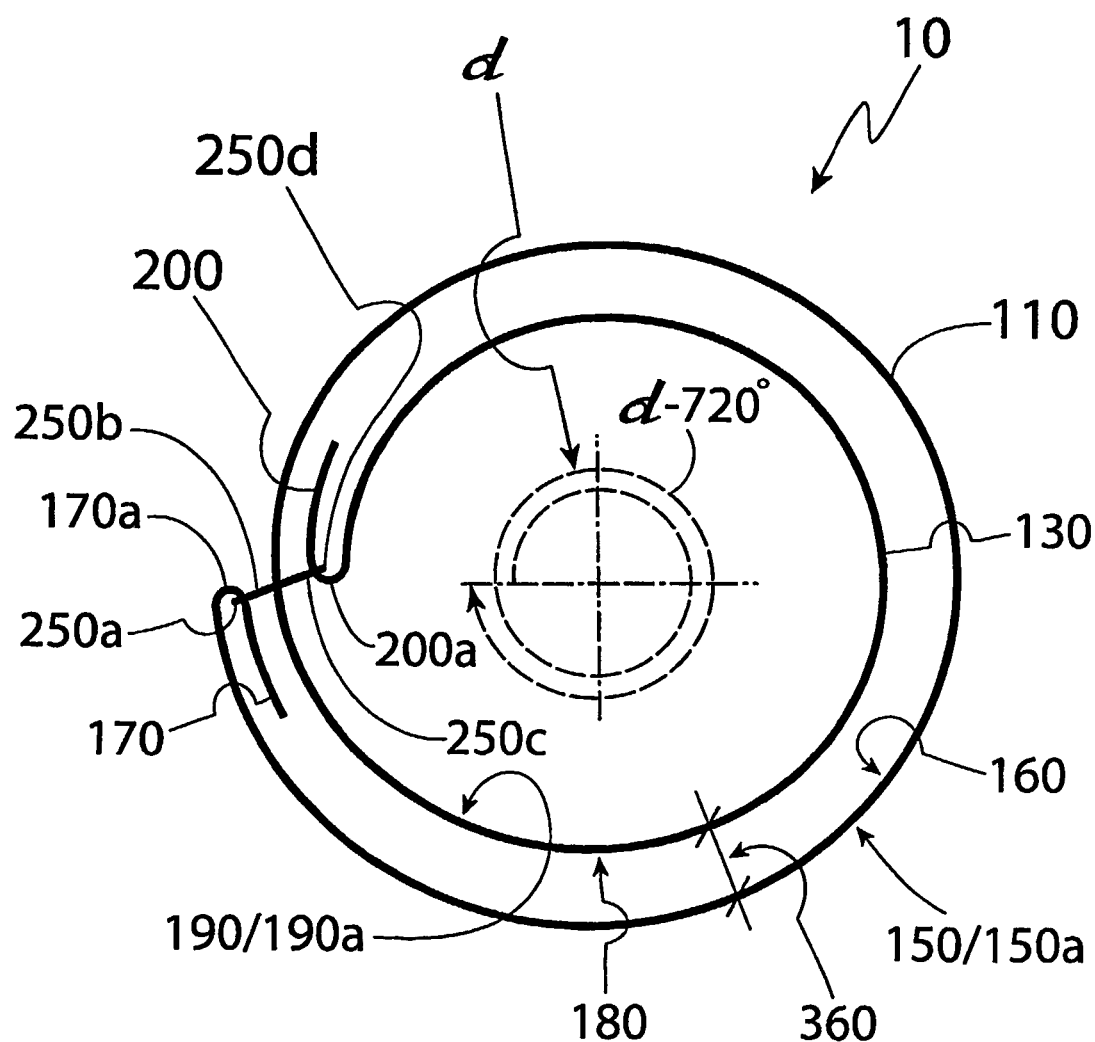
FIG. 5 is an end view in elevation showing the configuration of the first preferred embodiment after construction, and particularly illustrating how the vessel material forms a continuous 720 degree wrap to comprise the essential or bare vessel body.

As shown in FIG. 5, when fully configured, the folding and manipulation of the fabric inverts the position of outer portion inner surface 160 and inner portion outer surface 180 so that they are facing one another and, depending on portion dimensions, such that they may be fully approximated and in continuous physical contact along their width (except for interruptions at the seam allowances). The outer surface 150 of the outer portion 110 becomes the exterior surface 150a of the vessel body 10, and the inner surface 190 of the inner portion 130 becomes the innermost interior surface 190a of the vessel body. If it is desired that the inner and outer portions be in complete and continuous contact (for instance, when the pressure vessel functions as a volumetric container or a high pressure hose), the inner portion outer surface and the outer portion inner surface may be coated with an adhesive before folding to provide a strong binding between the layers. This will enhance the pressure resistance of the pressure vessel.

FIG. 5 also shows how the configuration of the first preferred embodiment of the inventive pressure vessel comprises a continuous 720 degree wrap d of the material comprising the bare vessel body 10, extending from a inner seam allowance bend 200a in inner seam allowance 200 to an outer seam allowance bend 170a in outer seam allowance 170. Finally, FIG. 5 illustrates a potential space 360 separating outer portion 110 and inner portion 130, which may be used for containing or conveying fluid or some other physical substance.

The foregoing inventive method of manufacturing a multilayered pressure vessel allows for considerable flexibility in designing and customizing the characteristics and features of the vessel and its various surfaces. For instance, while the fabric sheet is initially laid out flat, numerous attachments, auxiliary devices, surface textures and features, handles, grips, and so forth, can be affixed to the surface of a portion or portions of the fabric. Detail of this advantage is made more clear by the following descriptions of the second through fifth preferred embodiments of the inventive pressure vessel.

Figure 6:
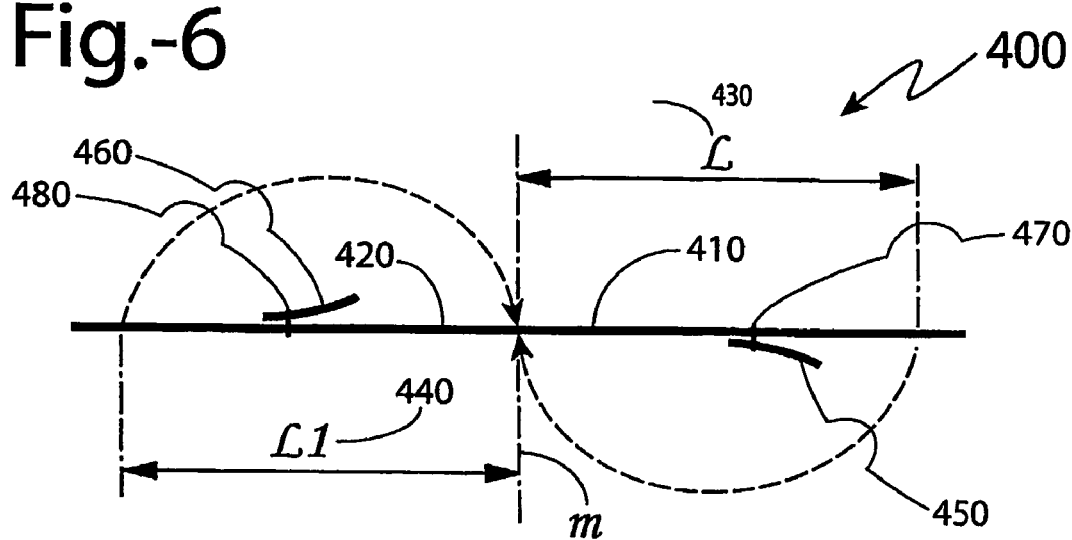
FIG. 6 is an end view in elevation of preconstruction fabric sheet employed in a second preferred embodiment of the inventive multilayered pressure vessel, showing the inner and outer portions, the midpoint of the fabric, the prospective seam allowances, and the location of possible attachment members.
Figure 7:
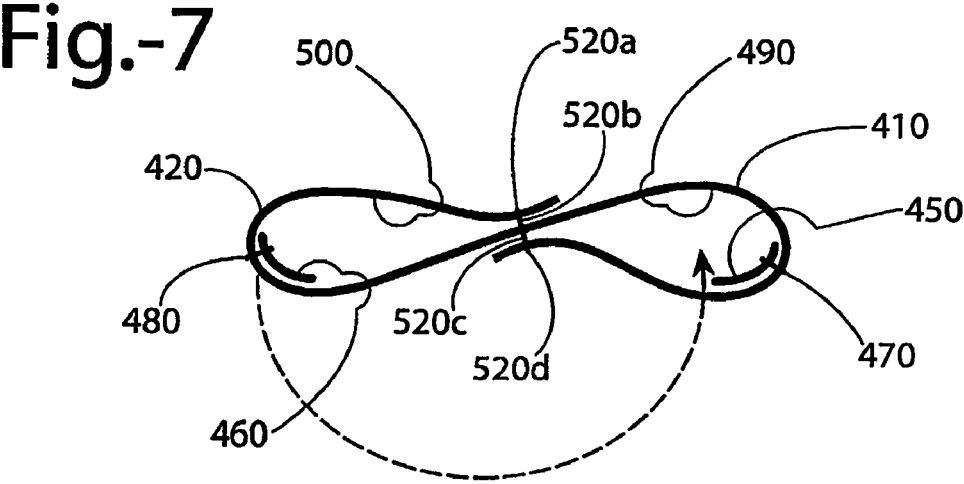
FIG. 7 is an end view in elevation of the fabric sheet of FIG. 6 shown with the outer and inner passageways of the inventive vessel formed with folds and also showing placement of the single primary seam of the constructed vessel.
Figure 8:
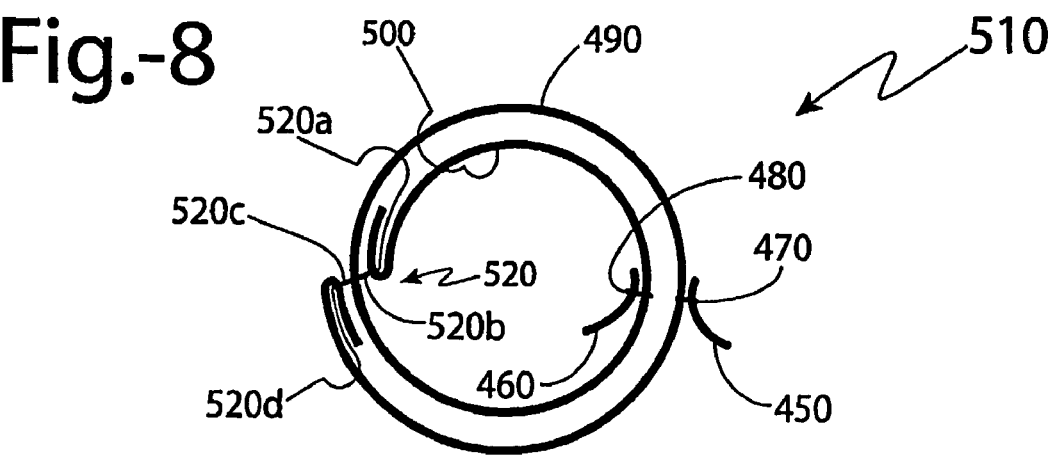
FIG. 8 is an end view of the second preferred embodiment of the constructed multilayered pressure vessel of the present invention, highlighting placement of attachment members on the interior and exterior surfaces of the vessel.

FIGS. 6–8 are end views in elevation of a second preferred embodiment of the pressure vessel of the present invention in various stages of manufacture. These views correspond to FIGS. 1–3 of the first preferred embodiment. As with the first preferred embodiment, a single sheet of flexible fabric 400 (viewed on edge) is provided and the geometry and general relative dimensions of the outer portion 410 and inner portion 420 are indicated by widths l 430 and $l_1$ 440, and by approximate midline M. However, in this embodiment, attachment elements 450 and 460 are affixed with attachment means 470, 480 preferably seams), to the outer surface 490 of outer portion 410, and the inner surface 500 of inner portion 420. Seam 520 is made at substantially the approximate midline after the inner and outer portions are folded, and manipulation of the assembly proceeds as described for the first preferred embodiment. Accordingly, upon completion of the vessel body 510 the seam includes hidden segments 520a–d.

Figure 19:
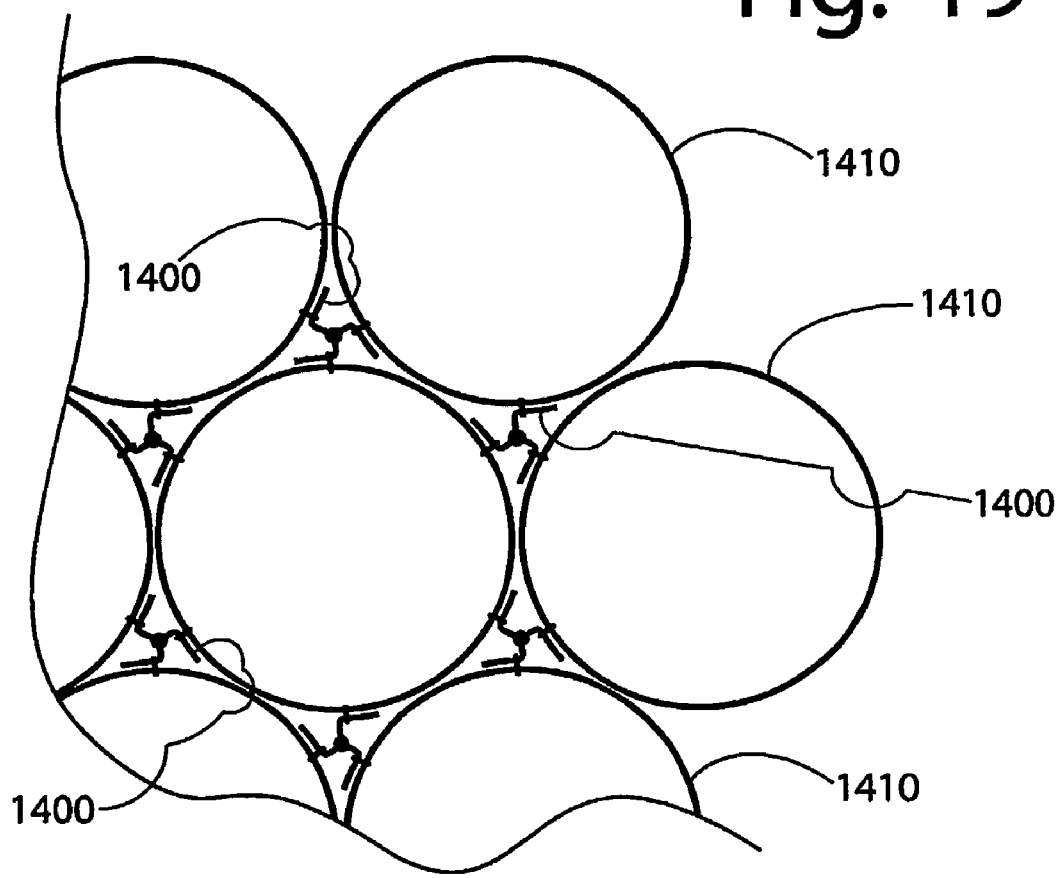
FIG. 19 is an end view in elevation showing connection means for a bundle of tubular pressure vessels.
Figure 20:
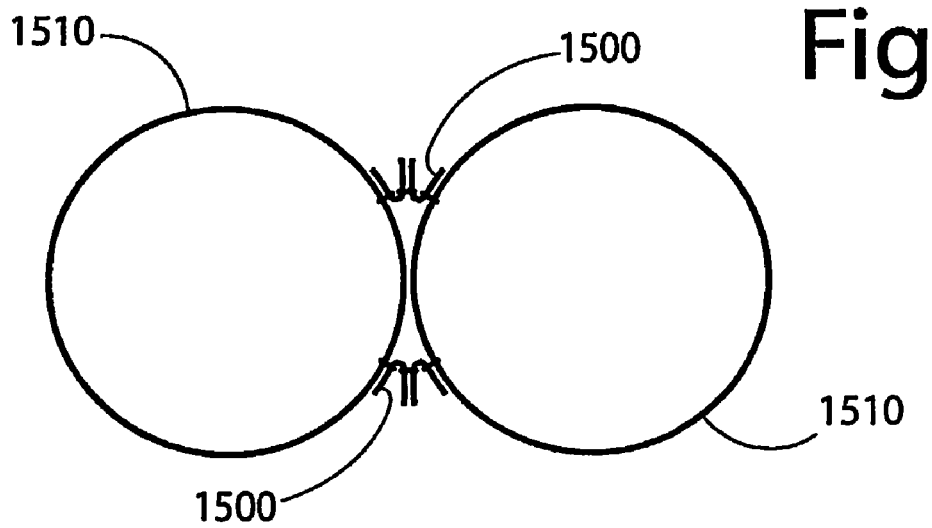
FIG. 20 is an end view showing alternative connection means for side-by-side tubular vessels.
Figure 22:
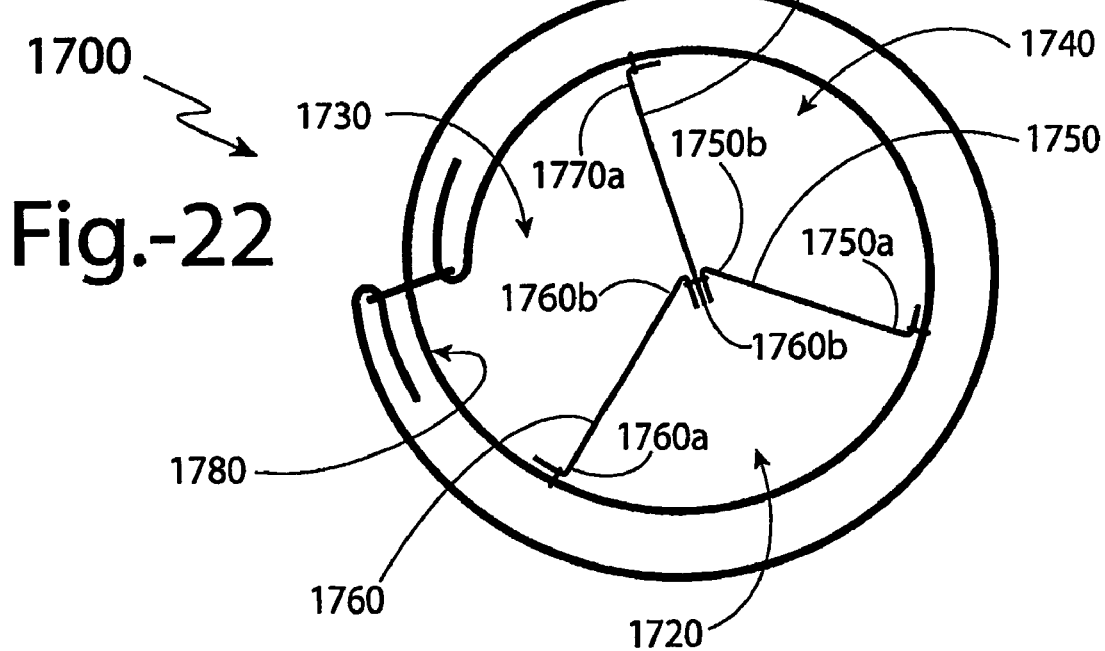
FIG. 22 is an end view in elevation showing an embodiment of the inventive pressure vessel having multiple interior fluid passages.

As will be readily appreciated, the attachment elements of this embodiment generally comprise a flap of fabric or other flexible material. When disposed on the exterior surface of the vessel body, the fabric flap may be employed for a variety of purposes, including the formation of a handle portion, construction of an exterior sleeve (as is discussed more fully in connection with FIGS. 10–14), formation of a hanging flap (FIG. 17). and connection means for joining the vessel body to other vessel bodies (FIGS. 19–20). However, depiction of the attachment as a loose fabric strip is for illustrative purposes only, the illustration intended to show the ease and convenience with which exterior and interior surface attachments, sleeves, surface textures and the like, can be applied to both the inner and outer portions of the fabric in the first stages of fabrication. This makes the formation of multi-passage vessels uniquely simple (see esp. FIG. 22).

Figure 9:
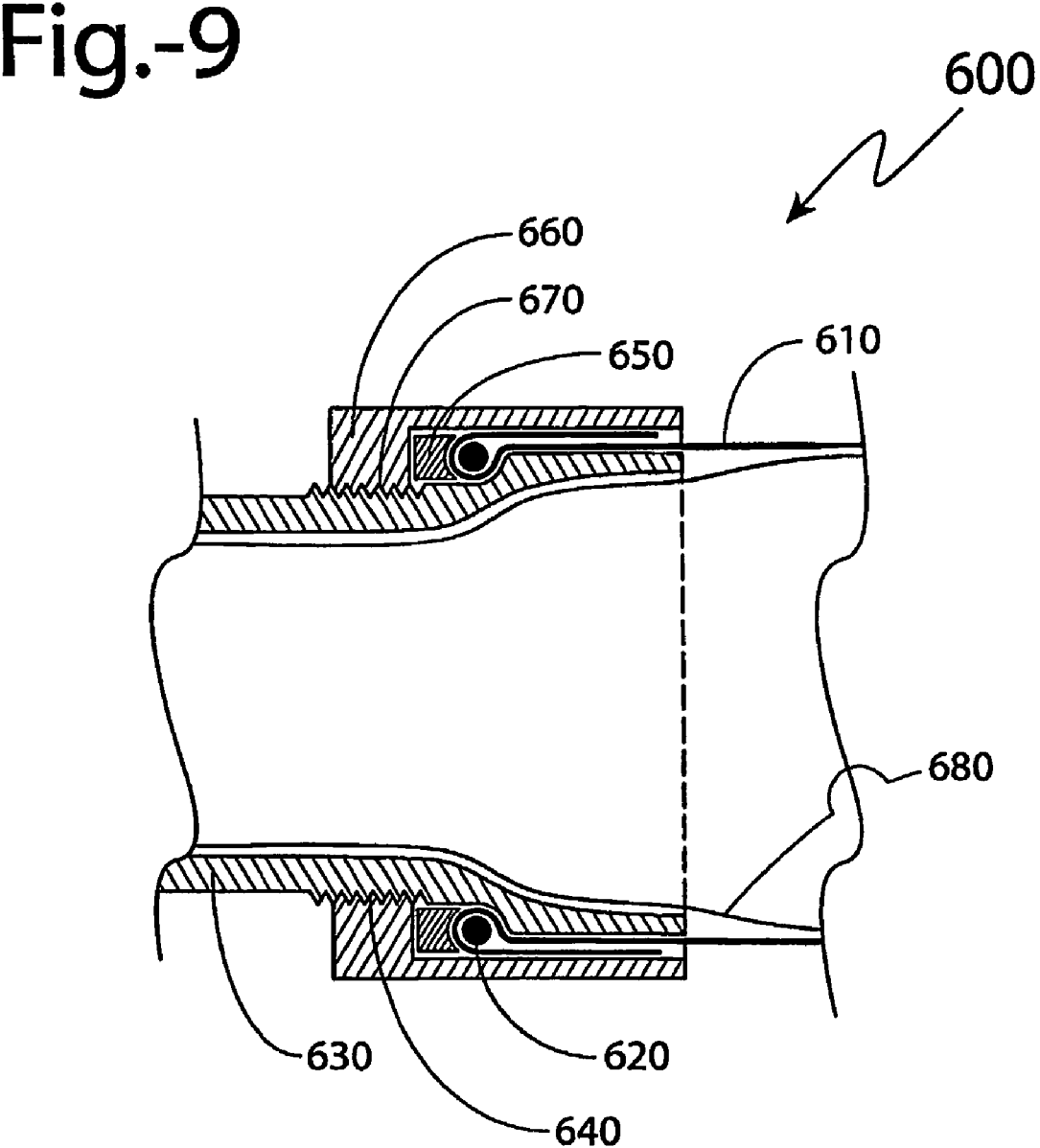
FIG. 9 is a partial cross-sectional side view in elevation of certain fitting elements adapted for installation on an end of the pressure vessel body.

FIG. 9 is a partial cross-sectional side view in elevation of selected end fitting elements 600 adapted for installation on an end of the pressure vessel body 610 when the pressure vessel is intended for use as a structural member. FIG. 9A is a partial cross-sectional perspective view of the complete fitting of FIG. 9, also showing the terminal fitting elements. In this preferred embodiment of an end fitting, pressure vessel body 610 is wrapped around a retaining ring 620 which is then snap fit over cap neck 630 having a threaded portion 640. A retaining washer 650 is placed over retaining ring 620 and then an outer pressure lock ring 660 having a threaded portion 670 is screwed onto cap neck 630. An inflatable bladder 680 may be retained by the end fitting. Its valve stem 690 is preferably disposed through a port plug 700 having a stem aperture (not shown, see FIG. 12, ref. no. 970), and secured in place with a washer 710 and nut 720. The port plug is oval-shaped to match an oval-shaped opening 730 in the terminal side 740 of cap neck 630. The port plug 700 has an interior flange 750 which prevents ejection of the port plug when the pressure vessel is under interior pressure, but it allow for selective removal by simply turning the plug so that its smallest dimension will emerge from the opening 730. Cap neck 630 may include a plurality of bolts or other fasteners extending from the fitting, the orientation of which is dictated by the intended use and the contemplated configuration of adjoining structural members.

Figure 10:
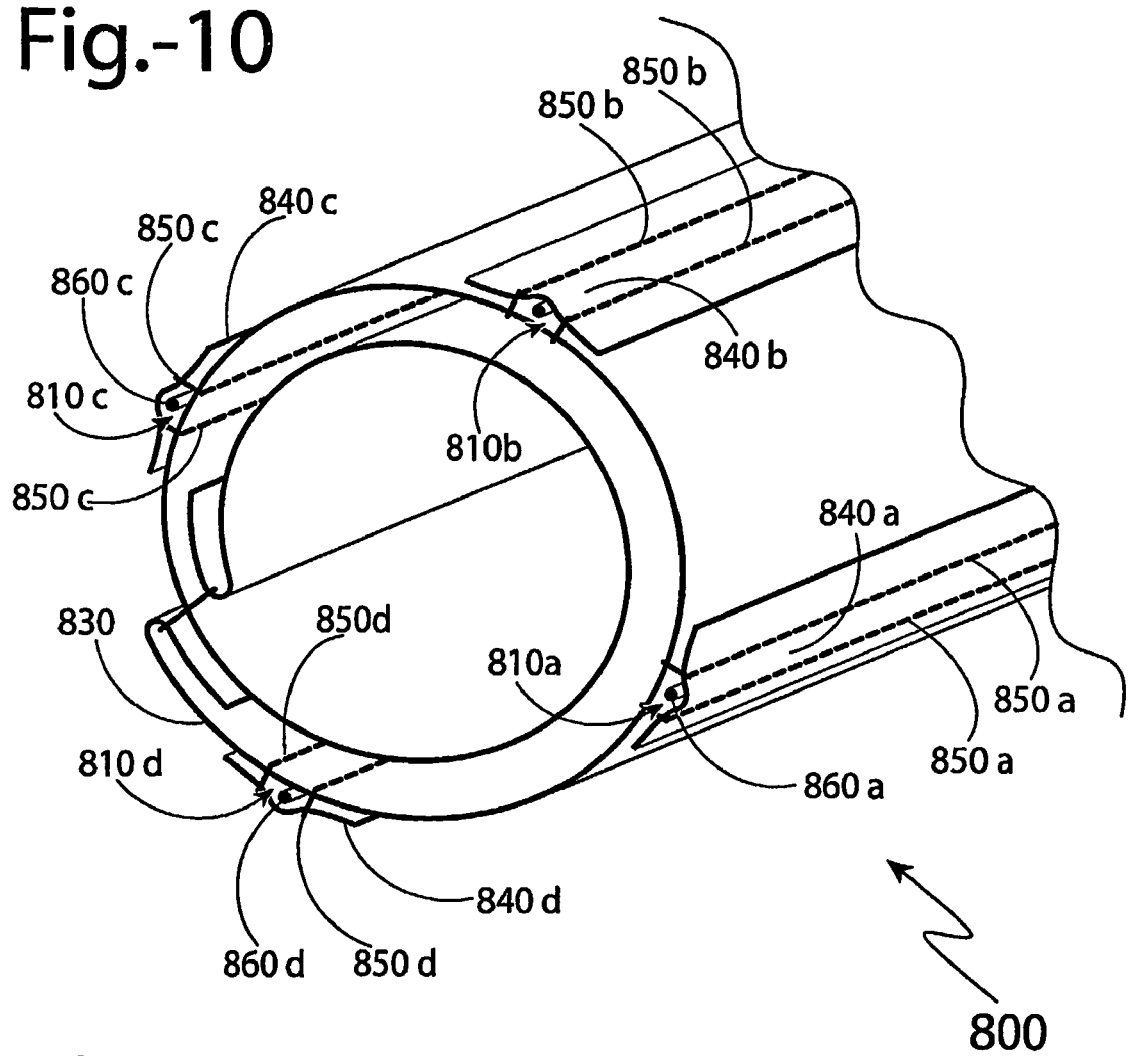
FIG. 10 is a perspective view of an end of a third preferred embodiment of the inventive pressure vessel, showing the constructed vessel having a plurality of sleeves for the insertion of tuning cables.

FIGS. 10–13 are various views of a third preferred embodiment of the inventive pressure vessel having a tubular configuration and adapted for the installation of fittings at each of its ends. FIG. 10 is a perspective view showing the vessel body 800 having a plurality of tuning cable sleeves 810a–d formed on the exterior surface 820 of the outer portion 830 of the vessel body. The tuning cable sleeves may be made from fabric strips 840a–d sewn or otherwise affixed at their edges 850a–d to the outer portion, wherein the fabric is not pulled taught but includes sufficient slack to produce the desired passage along the length of the vessel body. Preferably, each tuning cable passage includes a tuning cable 860a–d extending from one end of the vessel body to the other end.

Figure 11:
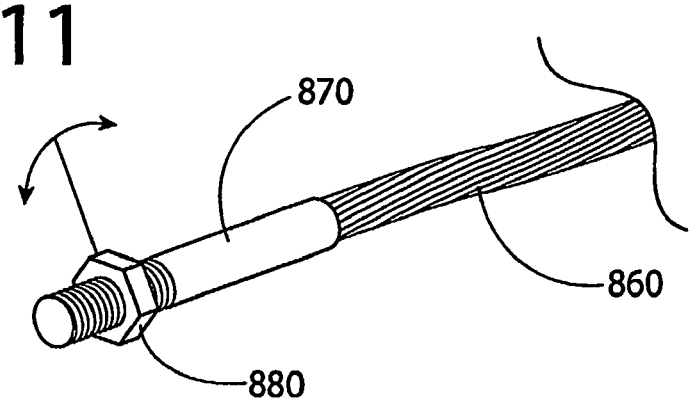
FIG. 11 is a perspective view of the end of a tuning cable.

FIG. 11 is a perspective view showing detail of the end of a tuning cable. This view shows that each tuning cable 860 generally includes a cable having a threaded pin 870 welded at its end and a nut 880 screwed onto the threaded pin.

FIG. 12 is a perspective view of the pressure vessel of FIG. 10 showing an alternative end fitting 900 fully installed on the pressure vessel, while FIG. 13 is a side perspective view of a complete pressure vessel with first and second end fittings 900a, 900b, respectively, at each end of the pressure vessel and tuning cables installed between the end fittings. These views illustrate the operation of the tuning cables in providing means to precisely adjust the length $l_2$ 910 of the vessel body, which length may therefore be characterized as a tunable length. The end fitting includes a cap neck 920 and a pressure lock ring 930, which further includes a rim or collar 940 with throughholes (not shown) for insertion of the threaded pins 870 of the tuning cable ends. Nuts 880 are then installed on the threaded pins so that tightening the nuts urges the fitting toward the fitting disposed on the opposite end of the vessel body, thereby slightly compressing the vessel body; loosening the nuts allows the vessel body to extend to a desired length. Once again, the fitting is preferably provided with an oval shaped opening 950 selectively sealed with a port plug 960. The port plug includes a hole 970 for insertion of a valve stem 980 of an inflatable bladder (not shown) disposed within the tubular vessel body.

Fitting 900a may also include bolts 990 or other connection means for attaching the pressure vessel to other pressure vessels or to auxiliary hardware. In this instance, the bolts are shown extending from the pressure lock ring, though it will be readily appreciated that connection means may be disposed on or about the fitting at a number of suitable locations, depending upon the configuration of the structure in which the pressure vessel is employed. It will also be readily appreciated that ring fittings comprise the general configuration of end fittings for generally cylindrical embodiments of the pressure vessel. It is well known that such fittings can be equipped with numerous kinds of attachment mounts or connection means, including, among others, threaded studs, locking pins, bayonet mounts, clevis pins, flanged edges, cord ends, webbing, belts, and the like. Accordingly, the pressure vessel may be adapted for use in slow to rapid assembly structural units, from tents and inflatable bridges, to antennas, airfoils, and countless other structures. Finally, it will be appreciated that in those instances in which a generally tubular or cylindrical pressure vessel is provided with end fittings and an inflatable bladder, only one end fitting need be adapted for insertion of the bladder's valve stem or other gas inlet means.

Figure 14:
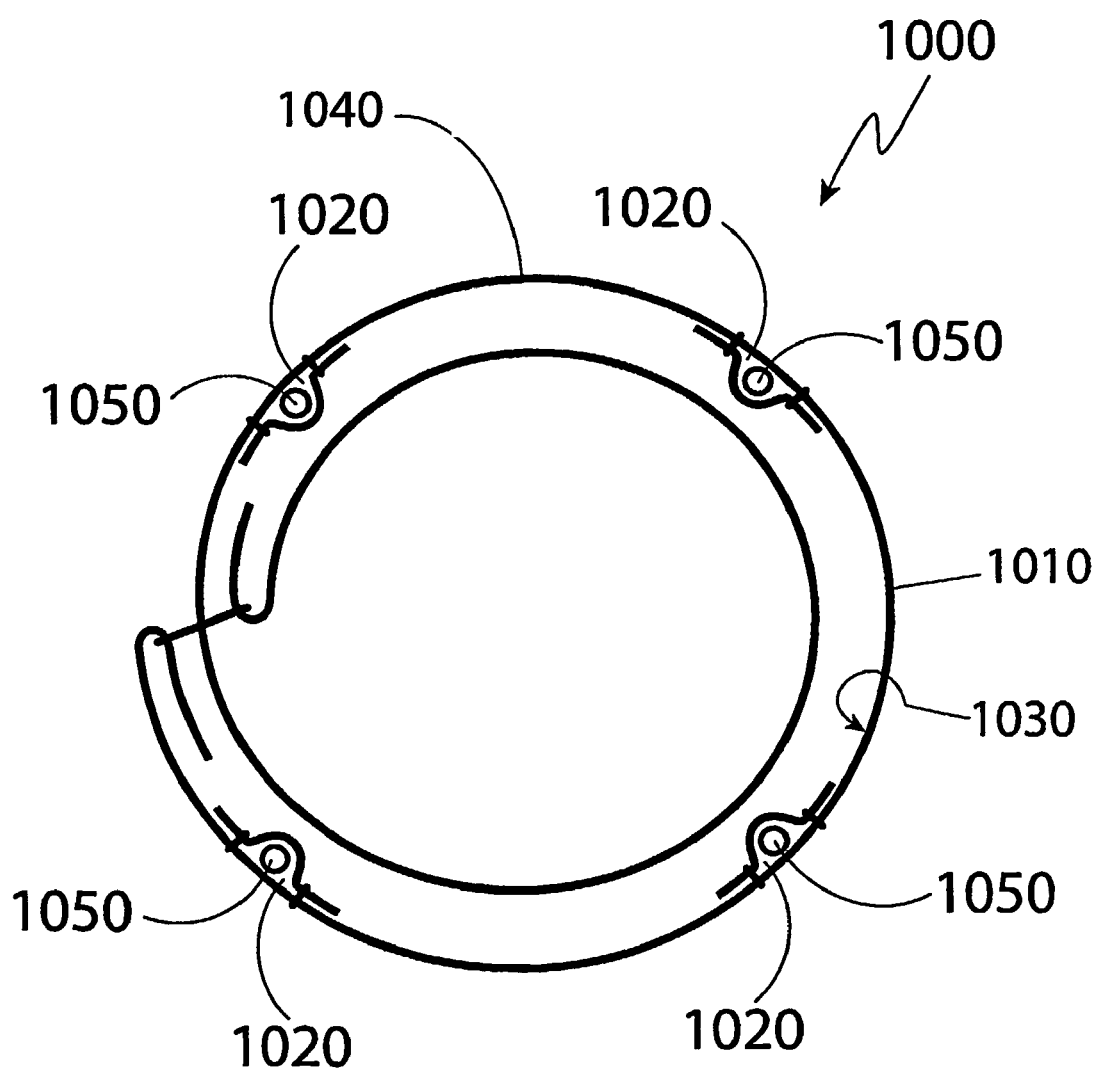
FIG. 14 is an end view in elevation of a pressure vessel body showing an alternative arrangement of tuning cable sleeves and tuning cables, disposed between layers in the interior of the multilayered pressure vessel.

FIG. 14 is an end view in elevation of a fourth preferred embodiment 1000 of a pressure vessel body 1010 in which a plurality of tuning cable sleeves 1020 are disposed on the interior surface 1030 of the outer portion 1040 of the vessel body. Affixation of the fabric pieces comprising the cable sleeves and installation of the tuning cables 1050 is accomplished in the manner described above.

Figure 15:
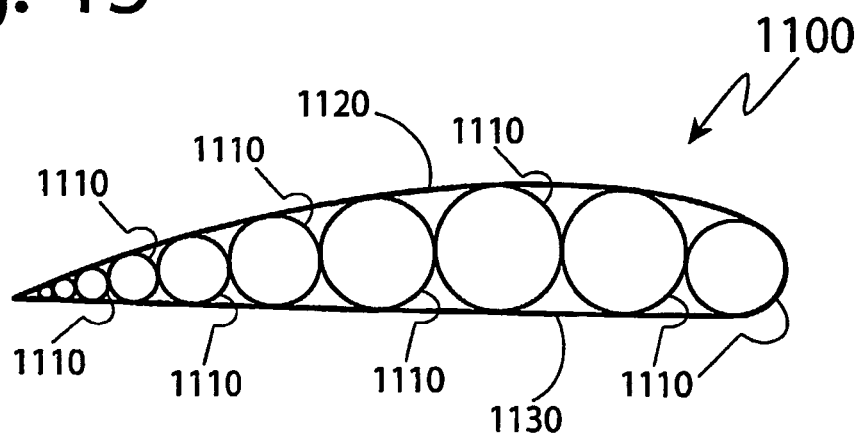
FIG. 15 a cross-sectional end view in elevation of airfoil or wing having tubular pressure vessels forming a plurality of wing spars.

FIG. 15 a cross-sectional end view in elevation of airfoil or wing 1100 having tubular pressure vessels 1110 sized and configured in a side-by-side arrangement to form and function as a wing spar assembly. As spars the pressure vessels provide support and rigidity to prevent buckling or collapse of the upper and lower airfoil surfaces 1120, 1130, respectively, of the wing, as is well known in the art.

Figure 16:
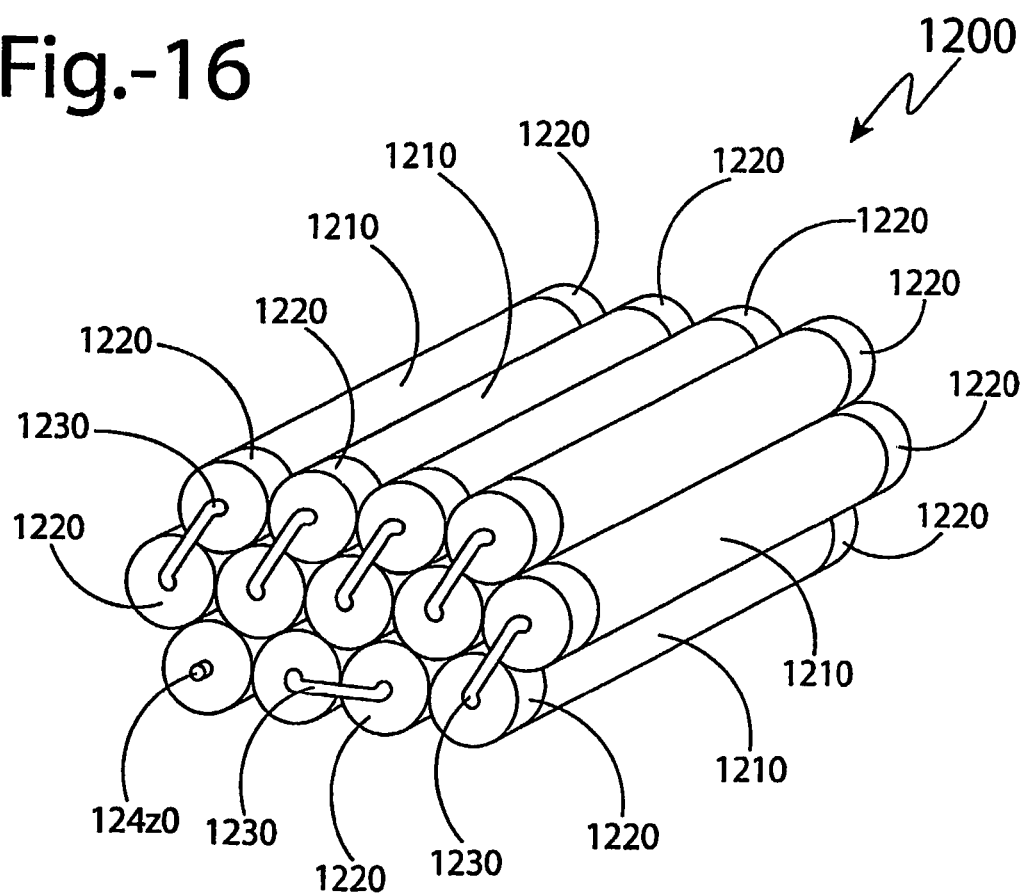
FIG. 16 is perspective view showing a bundle of tubular pressure vessels forming a pressure tank having multiple inflatable chambers.

FIG. 16 is perspective view of a pressure vessel assembly 1200 showing a plurality of tubular pressure vessels 1210 in fluid communication with one another to form an integrated multi-chambered pressure tank. Each pressure vessel includes at least one end fitting 1220 having a hose or other conduit 1230 placing the pressure vessel into fluid communication with an adjoining or nearby vessel or vessels. The assembly includes at least one gas inlet 1240 for the introduction of a pressurized gas into the assembly.

Figure 17:
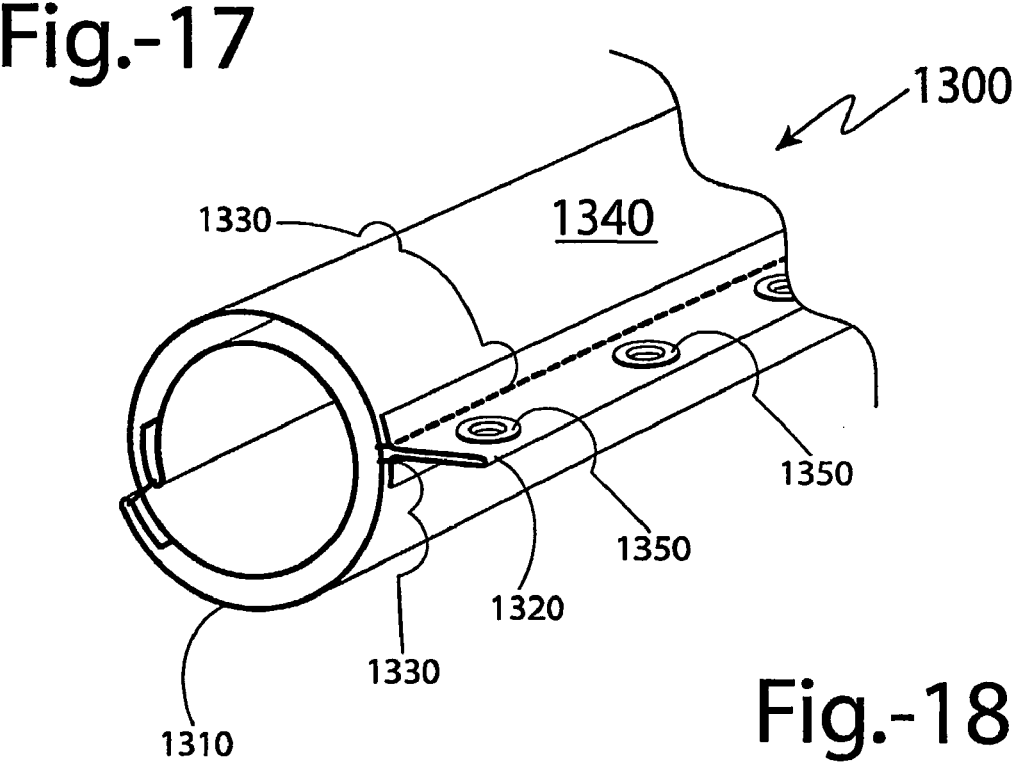
FIG. 17 is a perspective view of a tubular pressure vessel having an exteriorly attached flange having grommets.
Figure 18:
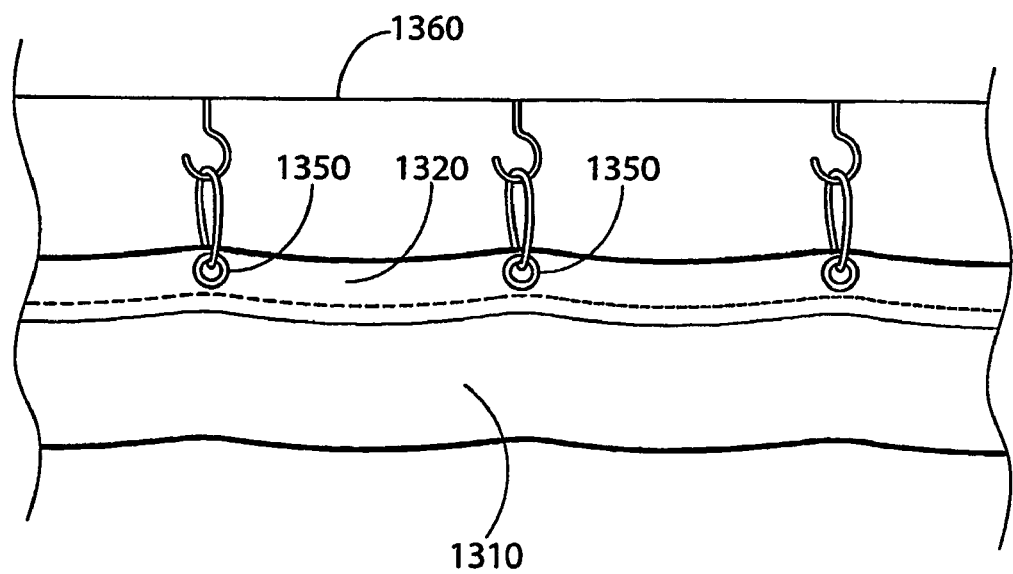
FIG. 18 is a side view in elevation showing the pressure vessel of FIG. 17 draped from I-hooks.

FIG. 17 is a perspective view of a fifth preferred embodiment 1300 of a tubular pressure vessel 1310 having a flange 1320 attached with seams 1330 to the outer surface 1340 of the vessel. The flange includes grommets 1350 suitable for use in draping the pressure vessel from a support line 1360 (FIG. 18).

FIGS. 19 and 20 are end views in elevation showing possible configurations of connection means for adjoining tubular pressure vessels. The connection means 1400 (FIG. 19), 1500 (FIG. 20), comprises a plurality of attachments sewn or otherwise affixed to the outer surfaces 1410, 1510 of the vessel bodies and to the surfaces of any neighboring vessel body.

Figure 21:
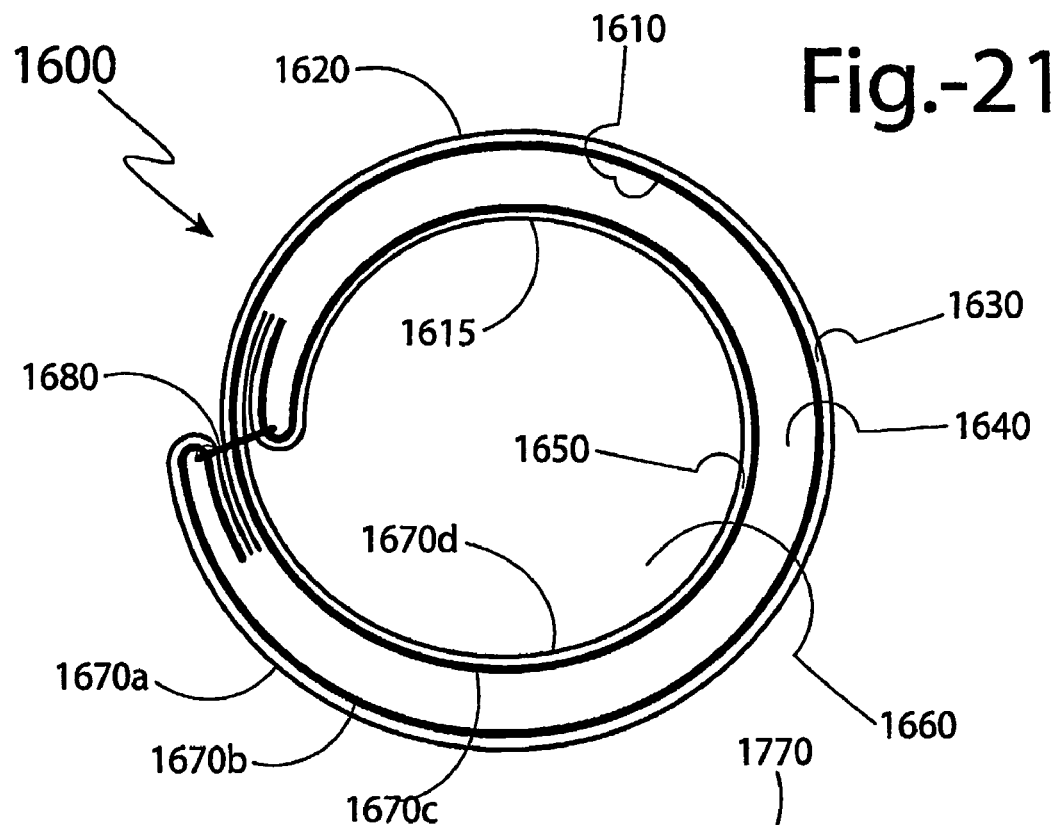
FIG. 21 is an end view showing an alternative embodiment of the inventive pressure vessel having four layers of material forming the pressure vessel body.

FIG. 21 is an end view showing a sixth preferred embodiment 1600 of the inventive multilayered pressure vessel. In this embodiment, two fabric sheets 1610, 1620 are initially laid out, one atop the other, each sheet having outer and inner portions with differential widths suitable for forming first through fourth fluid passageways 1630, 1640, 1650, and 1660, and having first through fourth layers 1670a–d of material forming the vessel body. As in the first preferred embodiment, the wrap forming the vessel is a continuous 720 degree wrap. When fully configured, the vessel may include one to four passageways, depending upon the dimensions of the partitioned layers and, therefore, how they separate and become spaced apart during construction. The seam 1680 spans all layers but is hidden at the surface and includes hidden segments, as earlier described.

FIG. 22 is an end view in elevation showing a seventh preferred embodiment 1700 of the inventive pressure vessel 1710 having multiple interior fluid passages, in this instance first through third interior fluid passages, 1720, 1730, 1740, each of which is defined by elongate flexible partition walls comprised of first through third material attachments 1750, 1760, and 1770, affixed to the interior surface 1780 of the vessel body. Location of the connections of the material attachments to the interior surface of the vessel body is proximate a first edge 1750a, 1760a, 1770a. The attachments are then collectively joined and affixed to one another proximate a second edge of each attachment, 1750b, 1760b, 1770b, respectively. While it is shown that the passageways are roughly equal in size and volume, it will be readily appreciated that by varying the length of the partition walls, the size, shape, and volume of the passageways may be substantially altered. In this fashion, the pressure vessel of the present invention may be adapted for use as a multilayered, multipurpose fluid conveying apparatus (i.e., a hose) for selectively conveying and discharging different fluids simultaneously (to be mixed at discharge), or separately. For instance, the hose could be adapted for use as a multipurpose fire hose, discharging a chemical fire retardant in one instance, and in another instance water.

Figure 23:
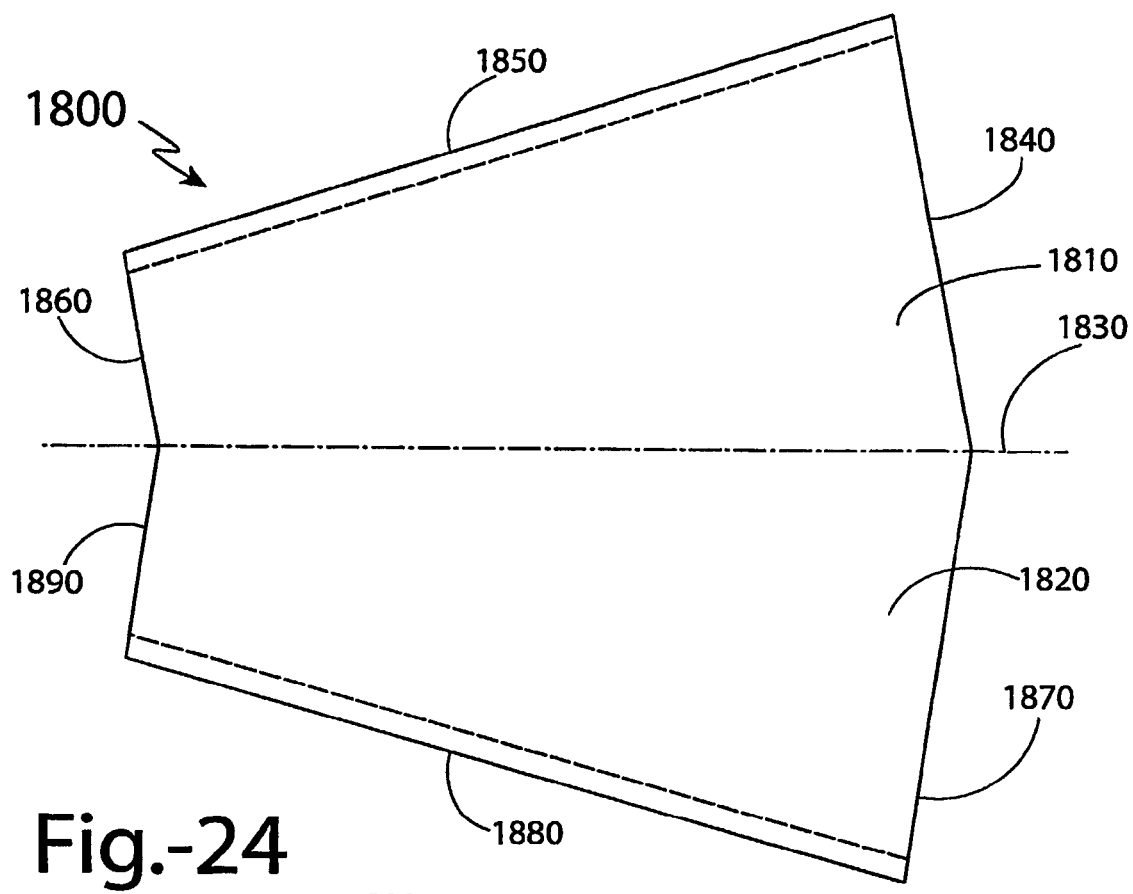
FIG. 23 is a top plan view of a section of fabric sized for construction into a cone-shaped pressure vessel.
Figure 24:
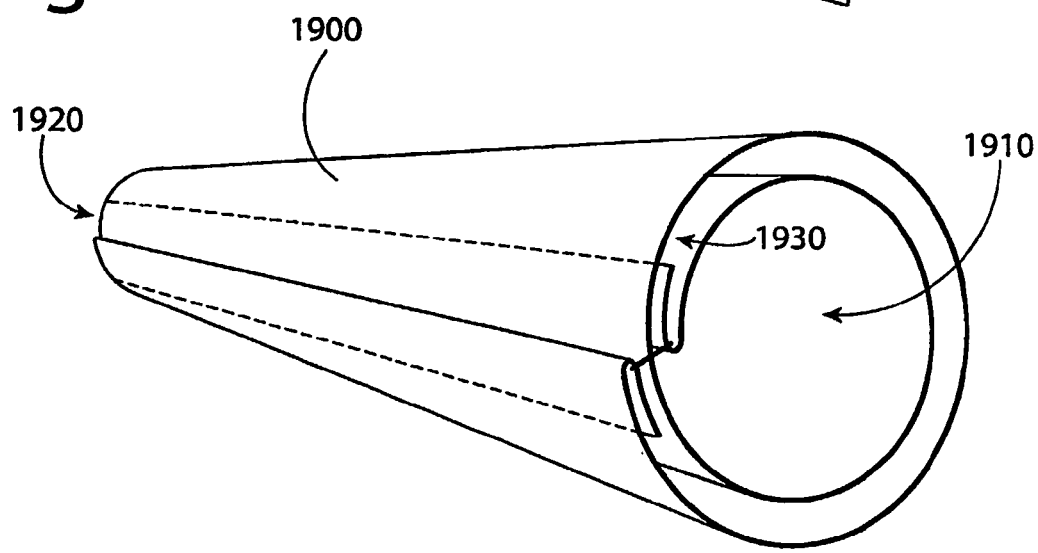
FIG. 24 is a cone-shaped pressure vessel constructed of the fabric section of FIG. 23.

FIG. 23 is a top plan view of a section of fabric 1800 sized and configured for construction into the eighth preferred embodiment of the inventive pressure vessel, comprising a cone-shaped pressure vessel body 1900, as shown in FIG. 24. The principles and process of construction are identical to those of the first embodiment. However, in contrast to the substantially cylindrical embodiments of the present invention, in this embodiment the initial section of fabric 1800 includes two portions, each of which comprises a trapezium (a quadrilateral with one pair of opposite sides parallel) or a trapezoid (a quadrilaterals with no parallel sides), depending upon the ultimate size of the openings desired. In any event, the quadrilateral shapes are composed of a single section of fabric, which includes an inner portion 1810 and an outer portion 1820, substantially symmetrical with the inner portion about a midline axis 1830 which defines a shared side for each quadrilateral portion. The outer portion of the fabric (and the vessel) includes first, second, and third exposed sides 1840, 1850, 1860; the inner portion of the vessel includes corresponding first, second and third exposed sides, 1870, 1880, 1890. Sides 1870 and 1890 are shorter in width than sides 1840, and 1860, their counterparts in the outer portion. Thus, the inner and outer portions are not entirely symmetrical, in that the inner portion must of necessity be slightly smaller so as to form a passageway slightly smaller than that formed by the outer portion.

When constructed, in a manner identical to that described above for other embodiments, the vessel body of the eighth preferred embodiment comprises a truncated cone, having a large opening 1910 and a small opening 1920 which has a smaller diameter than that of the large opening. This shape is suitable for use in structures requiring support members that taper in size, including, for example, an air foil or wing, as shown in FIG. 15. In most instances, the outer and inner portions will be approximated over their opposing surfaces; however, it may be desirable to provide a fluid passageway 1930 between the portions.

In an alternative to the eighth embodiment, the fabric section can be divided to comprise quadrilaterals having substantially different sizes so that the constructed vessel has an inner passageway that is significantly smaller than the outer passageway, and thus a well defined passageway between the inner and outer portions.

Materials for making the inventive pressure vessel are selected according to the intended application. In the most lightweight versions, the pressure vessel would be made of material having a filament reinforced matrix structure, preferably a composite of high-tenacity continuous fibers and a flexible matrix material. Even more preferably, the fibers would be predominantly bias-oriented, the orientations being optimized to make the fibers bear the tensile loads in the structure. This would effectively minimize the need for stitching and fill (weft) fibers for strength. Currently available lightweight, high tensile strength materials include, among others, such fabrics as aramid fiber, polyester fiber, gel-spun polyethylene fiber, aramid fiber based on metaterephthalamide polymer, and nylon. Film-type materials can also be employed, including such materials as polyethylene terephthalate film and aluminized terephthalate film. However, it will be appreciated that in numerous potential applications there will be no need for the use of exotic materials, and even simple sheets of cotton, polyester, cotton/polyester blends, and so forth may be suitable. Non-fibrous and non-porous natural and synthetic rubbers, polymers, and other elastomers may also be employed. When fibrous materials are employed, coatings may be applied to the material to increase strength and tailor the porosity and chemical reactivity of the vessel to its intended use. Selectively porous material, such as TYVEK® may also be employed, so that the pressure vessel may be employed as a filter. Alternatively, non-porous material may be employed when the vessel is intended for use as a volumetric container.

Other uses of the inventive apparatus, such as a concrete form for columns, may entail fabrication from materials only sufficiently non-porous to prevent impregnation by wet concrete.

The foregoing disclosure is sufficient to enable one having skill in the art to practice the invention without undue experimentation, and provides the best mode of practicing the invention presently contemplated by the inventor. While there is provided herein a full and complete disclosure of the preferred embodiments of this invention, it is not intended to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Accordingly, the proper scope of the present invention should be determined only by the broadest interpretation of the appended claims so as to encompass all such modifications as well as all relationships equivalent to those illustrated in the drawings and described in the specification.

What is claimed is:

1. A multilayered pressure vessel, comprising:
    at least one single ply sheet of flexible material (100) having an approximate longitudinal midline (M) dividing said sheet of flexible material into an inner portion (130) having an inner surface (190), an outer surface (180), an edge (195), a seam allowance (200), and a width (140), and an outer portion (110) having an inner surface (160), an outer surface (160), an edge (165), a seam allowance (170), and a width (120), wherein said width of said outer portion is greater than said width of said inner portion; and
    a primary seam (250) binding said outer portion and said inner portion to said sheet of flexible material at the approximate midline and proximate said outer portion edge and said inner portion edge;
    wherein said sheet of flexible material is wrapped into a substantially continuous, approximately 720 degree wrap to form a vessel body in which said outer surface of said outer portion forms the exterior surface (150a) of said multilayered pressure vessel, said inner surface of said inner portion comprises the innermost interior surface (190a) of said vessel body, said outer surface of said inner portion and said inner surface of said outer portion are in face-to-face relation, and said seam is concealed by said seam allowance of said outer portion.

2. The multilayered pressure vessel of claim 1, wherein said outer portion and said inner portion are each substantially rectangular and said vessel body (10) is substantially cylindrical.

3. The multilayered pressure vessel of claim 1, wherein said outer portion and said inner portion are each a trapezium and said vessel body (1900) comprises a truncated cone shape.

4. The multilayered pressure vessel of claim 1, wherein said apparatus has a proximate end (340) and a distal end (350), and wherein each end has an end fitting (600), at least one of which includes gas inlet and outlet means (690).

5. The multilayered pressure vessel of claim 4, wherein at least one said fittings includes:
    a cap neck (630), said cap neck having a coupling means (640) and a terminal side (740);
    an outer pressure lock ring (660) coupled to said cap neck through coupling means (670) complementary to said cap neck coupling means;
    a retaining ring (620) snap fit over said cap neck and around which is wrapped the pressure vessel body, said retaining ring interposed between said cap neck and said outer pressure lock ring; and
    a retaining washer (650) is placed over said retaining ring and interposed between said pressure lock ring, said retaining ring, and said cap neck.

6. The multilayered pressure vessel of claim 5, further including a plurality of tuning cables (860) connected to and extending between said end fittings.

7. The multilayered pressure vessel of claim 6, further including a plurality of cable tuning sleeves (840) disposed on said exterior surface of said apparatus, each cable tuning sleeve covering at least one tuning cable.

8. The multilayered pressure vessel of claim 6, further including a plurality of cable tuning sleeves (1020) disposed between said outer portion inner surface and said inner portion outer surface, each of said sleeves containing at least one tuning cable.

9. The multilayered pressure vessel of claim 4, further including a hose for placing said apparatus into fluid communication with another multilayered pressure vessel.

10. The multilayered pressure vessel of claim 1, further including at least connection means for connecting said apparatus to other multilayered pressure vessels.

11. A method of making a pressure vessel, comprising the steps of:
    (a) providing a generally elongate flexible material sheet (100) having a proximal end (340), a distal end (350), and first and second edges (165), (195);
    (b) folding the sheet by bringing the first edge downward and under the sheet to form an outer portion (110) having an outer portion flap (280), an outer passageway (230), and a first seam allowance (170);
    (c) folding the sheet again by bringing the second edge upward and over the sheet to form an inner portion (130) having an inner portion flap (270), an inner passageway (240), and a second seam allowance (200), and such that the first and second seam allowances overlap and such that a section (260) of sheet is interposed between the inner and outer portion flaps and the first and second seam allowances to form a multilayered configuration (20);
    (d) sewing a seam to make a single primary seam (250), which binds the layers of the multilayer configuration together;
    (e) providing pulling means (310) and affixing the pulling means to the inner portion upper flap (270) at the proximate end (340) of the sheet; and
    (f) pulling the inner portion into outer passageway (230) at the proximate end (340) while simultaneously turning outer portion (110) inside out by pulling its distal end (350) over the increasingly overlapping outer and inner passageways, thereby turning the apparatus inside out and pulling primary seam (250) interiorly such that it is interposed between the outer portion (110) and the inner portion (130).

12. The method of claim 11, wherein at step (e) the pulling means is a line.

13. The method of claim 11, wherein step (a) comprises providing a flexible material sheet having an approximate longitudinal midline dividing the sheet into substantially rectangular inner and outer portions.

14. The method of claim 11, wherein step (a) comprises providing a flexible material sheet having an approximate longitudinal midline dividing the sheet into an inner portion comprising a trapezium and an outer portion comprising a trapezium.

15. A multilayered pressure vessel produced according to the process of claim 11.

16. A multilayered pressure vessel produced according to the process of claim 13.

17. A multilayered pressure vessel produced according to the process of claim 14.

* * * * *